(12) United States Patent
Fujii et al.

(10) Patent No.: US 7,843,777 B2
(45) Date of Patent: Nov. 30, 2010

(54) ASSEMBLY METHOD OF OPTICAL PICKUP AND OPTICAL PICKUP APPARATUS

(75) Inventors: Hideyuki Fujii, Yoshikawa (JP); Tatsuji Kurogama, Hachioji (JP); Katsuya Yagi, Hino (JP); Katsumi Fujiwara, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 1502 days.

(21) Appl. No.: 11/181,630

(22) Filed: Jul. 13, 2005

(65) Prior Publication Data

US 2006/0018214 A1 Jan. 26, 2006

(30) Foreign Application Priority Data

Jul. 21, 2004 (JP) .............................. 2004-212477

(51) Int. Cl.
G11B 7/00 (2006.01)
G11B 7/135 (2006.01)
(52) U.S. Cl. ................................. 369/44.32; 369/112.24
(58) Field of Classification Search ... 369/44.37–44.38, 369/112.01, 112.08, 112.13, 112.2, 112.23–112.26; 359/819–823
See application file for complete search history.

(56) References Cited

U.S. PATENT DOCUMENTS

| 5,553,052 | A | * | 9/1996 | Oono et al. ............. 369/112.17 |
| 5,757,758 | A | * | 5/1998 | Yagi et al. ............... 369/112.25 |
| 6,122,237 | A | * | 9/2000 | Ohmori et al. ........... 369/53.19 |
| 6,282,161 | B1 | * | 8/2001 | Son et al. ................. 369/53.19 |
| 6,304,526 | B1 | * | 10/2001 | Nagashima et al. ....... 369/44.23 |
| 6,344,935 | B1 | * | 2/2002 | Maruyama ............. 369/112.26 |
| 2003/0053394 | A1 | * | 3/2003 | Park et al. .............. 369/112.05 |
| 2003/0147148 | A1 | * | 8/2003 | Kubo .......................... 359/719 |
| 2003/0161249 | A1 | * | 8/2003 | Kamisada et al. ....... 369/112.23 |
| 2004/0114495 | A1 | * | 6/2004 | Kim et al. ............... 369/112.24 |
| 2004/0165520 | A1 | * | 8/2004 | Heor et al. .............. 369/112.24 |
| 2005/0286355 | A1 | * | 12/2005 | Kim et al. ................. 369/44.14 |

FOREIGN PATENT DOCUMENTS

| JP | 2001-060336 | 3/2001 |
| JP | 2002-298422 | 10/2002 |

OTHER PUBLICATIONS

Office Action issued for Chinese Application No. 200500240714, Apr. 4, 2008.

* cited by examiner

*Primary Examiner*—Wayne R Young
*Assistant Examiner*—Nathan A Danielsen
(74) *Attorney, Agent, or Firm*—Cohen Pontani Lieberman & Pavane LLP

(57) ABSTRACT

A method for assembling an optical pickup apparatus for recording/reproducing a high density DVD, DVD and CD including two objective lens and three laser light sources, the objective lenses being provided on the lens holder having an actuator base for supporting the actuator, the method for assembling the optical pickup apparatus comprises the steps of adjusting a first tilt angle of the actuator base so that a coma aberration of a spot formed by the first light beams decreases when the first light beams are converged onto the first recording medium via the first objective lens, and adjusting a second tilt angle formed between the second objective lens and the lens holder so that a coma aberration of a beam spot formed by the second light beams decreases when the second light beams are converged onto the second recording medium via the second objective lens.

14 Claims, 12 Drawing Sheets

ASSEMBLY METHOD OF OPTICAL PICKUP AND OPTICAL PICKUP APPARATUS

RELATED APPLICATION

This application claims priority from Japanese patent Application No. JP2004-212477 filed Jul. 21, 2004, which is incorporated hereinto by reference.

TECHNICAL FIELD

The present invention relates to an assembly method of an optical pickup apparatus and the optical pickup apparatus being assembled by the assembly method. Particularly, the invention relates to the assembly method of an optical pickup apparatus having plural objective lenses and the optical pickup apparatus being assembled by the assembly method.

BACKGROUND

In recent years, the research and development of high density optical disc systems to/from which information is recorded and/or reproduced by applying blue violet semiconductor laser beams having a wavelength of around 400 nm has been rapidly progressed. As an example, an optical disc having specifications, in which an objective lens having NA (Numerical Aperture) of 0.85, and a light source having wavelength of 405 nm are applied to record and/or reproduce information, can store information of 20-30 GB per a side. In this specification, it is called "high density DVD" from now on, which has the same size of DVD having a diameter of 12 cm (NA: 0.6, light source wavelength: 650 nm, memory capacity: 4.7 GB).

It is not sufficient as an optical disc player/recorder to be simply able to record and/or reproduce information onto/from the high density DVD. Taking account that DVDs and CDs (compact discs) on which various kinds of information is recorded are on a marketplace, it is not enough as value of the optical pickup apparatus to be simply able to appropriately record/reproduce information onto/from a high density DVD. It is necessary for an optical pickup apparatus to record and/or reproduce information not only onto/from a high density DVD but also a conventional DVD and a CD which users posses in order to raise the product value as an optical pickup apparatus having recording/reproducing compatibilities. From these backgrounds, it is required that an converging optical system for an optical pickup apparatus has not only a simple and low cost structure but also secure a predetermined light beam amount for forming an optical spot to appropriately record and/or reproduce information onto/from high-density DVDs, convention DVDs and CDs. An example of optical pickup apparatus having compatibilities is described in Japanese Patent Application Open to Public No. JP2002-298422.

However, according to JP2002-298422 and JP2001-60336, a single objective lens (a lens group) is designed to converge respective three waves onto respective optical discs with minimum aberration (triple compatibility system). As a result, even though the objective lens is preferable from the cost point of view, the design margin for respective three wavelengths is small, and there is a problem that, in general, the design of the objective lens is difficult. Particularly, there is a problem that the objective lens having two-lens structure disclosed in JP2001-60336 based on the triple compatibility system requires the highly precise adjustment of an optical axis of those lenses. There is another problem that the thickness of the objective lens in the optical axis direction becomes thick. Accordingly, it is understood that there is a problem that to achieve the triple compatibility system by a single objective lens is unfavorable from the viewpoints of mass-productivity and the size of the objective lens.

On the contrary, for example, an optical pickup apparatus separately having two objective lenses, one for high density DVD and the other for DVD and CD, which can be selectively applied to converge recording beams and reflected beams according to the kind of optical disc to realize the triple compatibility system has been developed. However, in general, since the number of positions where the optical disc is placed is one, it is necessary to change the objective lens to be applied according to the kind of the optical disc. Since there are two independent objective lenses, it is necessary to conduct the coma adjustment for the tilt of each objective lens to appropriately record and/or reproduce information onto/from the optical disc. For example, it will be possible to correct the affect at a certain degree, even though the shift and the tilt of the objective lens occur when the optical pickup apparatus is assembled, if the optical pickup has a relative tilt angle changing mechanism, which can change the relative tilt angle formed between the optical disc and the objective lens. However, since the load of the relative tilt angle changing mechanism increases as the tilt angle becomes large, it is preferable that the tilt angle is minimized.

Here, it will be also possible to suppress the coma aberrations of both objective lenses by adjusting the tilt angle of an actuator base against the optical disc according to the tilt angle of the optical disc by attaching the two objective lenses having a small coma aberration on the actuator via a lens holder. However, according to this method, the coma aberration of the objective lens itself has to be small. In this case, there is a problem that it is difficult to manufacture such an objective lens. Further, when adhering the two objective lenses onto the actuator via the lens holder, it may be possible to adjust the angle formed between the objective lens and the optical pickup so that the respective optical axes of the two objective lenses become orthogonal to the optical disc. However, according to this method, there is a problem that the difference of respective coma aberrations of respective objective lenses cannot be fully adjusted. Accordingly, it is necessary to put priority on one of the objectives lenses or to adjust the coma aberration into the middle point between two objective lenses. Further, there is anther problem that the coma aberration caused by the position shift of three different light sources having different wavelengths cannot be corrected.

SUMMARY

An embodiment of the present invention is to provide an optical pickup apparatus and the method of the assembly of the optical pickup apparatus to solve the problem described above, which enable the reduction of an assembly time and appropriate recording and/or reproduction of information onto/from the optical disc, when assembling the optical pickup apparatus capable of recording and/or reproducing information onto/from three kinds of optical information recording media by applying the combination of three kinds of light beams, each having different wavelength, and two kinds of objective lens.

The first embodiment of the present invention is a method for assembling an optical pickup apparatus including, a first light source for emitting first light beams having wavelength of λ1 (380 nm≦λ1≦450 nm), a second light source for emitting second light beams having wavelength of λ2 (600 nm≦λ2≦700 nm), a third light source for emitting third light beams having wavelength of λ3 (750 nm≦λ3≦850 nm), a first objective lens, a second objective lens, a lens holder for holding the first objective lens and the second objective lens, an actuator for driving the lens holder, and an actuator base for supporting the actuator, wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1≦t2) of the second optical information recording medium via the second objective lens;

the third light beams from the third light source are applied to record and/or reproduce information onto/from a third optical information recording medium by converging the third light beams onto a information recording surface of the third optical information recording medium through a protective layer having thickness of t3 (t2≦t3) of the third optical information recording medium;

the optical pickup apparatus is used in an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing the relative tilt angle formed between the optical information recording medium and the objective lens;

the first objective lens is designed based on an image height priority design method against the first light beams, the image height design method being a design method for correcting a spherical aberration and a sine condition; and the second objective is designed based on the image height priority design method against the second light beams and the third light beams;

the method for assembling the optical pickup apparatus comprises the steps of:

adjusting a first tilt angle of the actuator base so that a coma aberration of a spot formed by the first light beams decreases when the first light beams are converged onto the first recording medium via the first objective lens, and adjusting a second tilt angle formed between the second objective lens and the lens holder so that a coma aberration of a beam spot formed by the second light beams decreases when the second light beams are converged onto the second recording medium via the second objective lens.

Firstly, "image height priority design method" and "tilt angle priority design method" will be described. "Image height priority design method" is a design method for correcting both a spherical aberration and a sign condition. FIG. 1(a) and FIG. 1(b) illustrate a block diagram of a system structured of light source LD, objective lens OBJ and optical disc OD. Fundamentally, the relationship between light source LD drawn by a dashed line and objective lens drawn by a solid line as shown in FIG. 1(a), or the relationship between the light source LD drawn by a solid line and objective lens drawn by a dashed line as shown in FIG. 1(b), in which the normal line of optical disc OD coincides with the optical axis of objective lens OBJ are preferable so that the optical axis of the light source LD coincides with the normal line. Against this ideal deployment, when light source LD shifts from the normal line in the direction orthogonal to the optical axis as shown in FIG. 1(a), the coma aberration occurs with light beam spot A formed on the information recording surface of optical disc OD. On the contrary, against this ideal deployment, the objective lens OBJ tilts against line L with angle θ as shown in FIG. 1(b), the coma aberration occurs with light beams spot B formed on the information recording surface of the optical disc OD.

Here, when the objective lens is designed based on "an image height priority design method", the coma aberration caused by the shift of the light source does not so heavily depend upon the incident angle of the objective lens, and is maintained in a low value. On the contrary, the coma aberration heavily depends on the tilt angle of the objective lens. The other hand, when the objective lens is designed based on the "a tilt angle priority design method", even though the coma aberration caused by the lens tilt angle is tremendously decreased, the dependency on the incident angle of the objective lens becomes high.

FIGS. 1(c) and 1(e) show the third-order coma aberration characteristic of the objective lens designed based on "image height priority design method". As it is clear from these figures, in the case of "an image height priority design method", even though the light source shifts against the optical axis of the optical pickup apparatus, the coma aberration hardly changes. On the contrary, when an optical disc or an objective lens tilts, the coma aberration extremely increases.

On the other hand, "a tilt angle priority design method" is a design method to correct spherical aberration but not to correct a sine condition. Namely, contrary to the "image height priority design method", the value of coma aberration corresponding to the tilt angle is suppressed relatively small when the coma aberration to occur associated with the light spot B formed on the surface of the information recording surface of the optical disc OD caused by the tilt of objective lens OBJ, as shown in FIG. 1(b). However, the coma aberration associated with light spot A formed on the information recording surface of optical disc OD when light source LD shifts from the line L in the direction orthogonal to the optical axis, the coma aberration corresponding to the shift amount becomes large, as shown in FIG. 1(a).

FIG. 1(d) shows the third order coma aberration characteristic of the objective lens designed by "tilt angle priority design method". As it is clear from the figures, even though when the objective lens is designed by the tilt angle priority design method, the amount of coma aberration caused by the tilt angle extremely decreases comparing with the image height priority design method, the dependency of the incident angle of the objective lens become large.

In this specification, an objective lens is defined as an objective lens designed by the image priority design when coma aberration to occur is not more than 0.03λ when incident angle is 1°, and other objective lenses are defined as objective lens designed by the tilt angle priority design method.

Objective lens design examples are shown below. λ denotes wavelength; NA denotes a numerical aperture; and t denotes thickness of a protective layer of an optical information recording medium.

(a-1)

λ=405±15 nm, NA=0.85±0.05, t=0.1±0.03 mm.

(a-2)

λ=405±15 nm, NA=0.65±0.05, t=0.6±0.05 mm.

(b)

λ=655±15 nm, NA=0.65±0.05, t=0.6±0.1 mm.

(c)

λ=780±15 nm, NA=0.50±0.05, t=1.2±0.1 mm.

In the optical design in the each range of (a-1), (a-2), (b) and (c), in the case of image height priority design method, coma aberration to occur is not more than 0.03 λrms when the incident angle of an objective lens is 1°. On the contrary, in the optical design in the each range of (a-1), (a-2), (b) and (c), in the case of slang angle priority design, coma aberration to occur is not more than 0.08 λrms when the incident angle of the objective lens is 1°. In the case of slang angle priority design, coma aberration to occur is not more than 0.04 λrms when the incident angle of the objective lens is 1°.

An object of the present invention is to attain the most suitable combination by utilizing the characteristic of the objective lens formed by these design methods described above. Further, with regard to the detection of the coma aberration when adjusting the beam spot, light beams passing through the objective lens may be observed by passing the light beams through a glass plate or a resin plate, which is corresponding to the protective layer of the information recording medium for each light source, the protective layer being positioned in the objective lens side. However, it is not limited to this method.

In the assembly method of the optical pickup described in the first embodiment of the present invention, the first objective lens is designed based on the image height priority design method against the light beams from the first light source, and the second objective lens is designed based on the image height priority design method against the light beams from the second and third light sources. Accordingly, the coma adjustment sensitivity against the tilt of incident light beams of each objective lens due to the light source shift is low when adjusting the coma aberration in the predetermined range. On the contrary, since the coma adjustment sensitivity against the tilt angle of the objective lens is high, the coma aberration of the light beam spot converged onto the information recording surface of the optical information recording medium can be suppressed against any one of these light sources by precisely adjusting the tilt angle of each objective lens, and appropriate information recording and/or reproducing can be conducted thereby. The coma aberration caused by the warp of the optical information recording medium and the coma aberration caused by the residual errors due to the limitation of component accuracy and assembly accuracy can be suppressed by applying the relative tilt angle changing device.

According to the assembly method of the optical pickup apparatus described in this specification, prior to the tilt angle adjustment of the objective lens which includes the tilt angle adjustment of the actuator base or the lens holder, or prior to the light source shift adjustment, it is preferable to adjust the tilt angle of the axes of light beams from the first light source, the second light source and the third light source, and optical axes of the first objective lens and the second objective lens, against the reference optical axis of the optical pickup apparatus within 1°. As a result, the tilt angle adjustment of the objective lens or the light source shift adjustment can be conducted within a short period of time. The reference optical axis of the optical pickup denotes the reference optical axis of a converging optical system of the optical pickup apparatus. In an actual design stage or an assembly stage, the shifting rail of a coarse actuator, etc., may be used as the reference optical axis.

FIG. 11 is a top view of an example of an optical pickup apparatus, which is the same optical pickup apparatus disclosed in Japanese Patent Application Open to Public Inspection H6-215384. Seek base SB is provided on the center of drive base B having spindle motor SM for driving optical disc OD, and rail RAIL for moving coarse actuator CA is arranged in one side of seek base SB. The rail RAIL is extending inside of paired coils COIL and coarse actuator CA is arranged so that the coarse actuator CA can moves in the radius direction of the optical disc OD while being guided by rail RAIL. Coarse actuator CA supports actuator base ACTB for driving lens holder HD.

The second embodiment of the invention is a method for assembling an optical pickup apparatus including, a first light source for emitting first light beams having wavelength of $\lambda 1$ (380 nm$\leq\lambda 1\leq$450 nm), a second light source for emitting second light beams having wavelength of $\lambda 2$ (600 nm$\leq\lambda 2\leq$700 nm), a third light source for emitting third light beams having wavelength of $\lambda 3$ (750 nm$\leq\lambda 3\leq$850 nm), a first objective lens, a second objective lens, a lens holder for holding the first objective lens and the second objective lens, an actuator for driving the lens holder and an actuator base for supporting the actuator, wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1$\leq$t2) of the second optical information recording medium via the second objective lens;

the third light beams from the third light source is applied to record and/or reproduce information onto/from a third optical information recording medium by converging the third light beams onto a information recording surface of the third optical information recording medium through a protective layer having thickness of t3 (t2$\leq$t3) of the third optical information recording medium;

the optical pickup apparatus is used in an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing the relative tilt angle formed between the optical information recording medium and the objective lens;

the first objective lens is designed based on an image height priority design method against the first light beams, the image height design method being a design method for correcting a spherical aberration and a sine condition; and the second objective lens is designed based on the image height priority design method against the second light beams, and a tilt angle priority design method against the third light beams, the tilt angle priority design method being a design method for correcting the spherical aberration while not correcting the sine condition, the method for assembling the optical pickup apparatus comprises the steps of:

adjusting a first tilt angle of the actuator base so that a coma aberration of a spot formed by the first light beams decreases when the first light beams are converged onto the first recording medium via the first objective lens, adjusting a second tilt angle formed between the second objective lens and the lens holder so that a coma aberration of a beam spot formed by the second light beams decreases when the second light beams are converged onto the second recording medium via the second objective lens; and conducting a shift adjustment process for the third light source so that a coma aberration of a beam spot formed by the third light beams decreases when the third light beams are converged onto the third recording medium via the second objective lens.

According to the method for assembling the optical pickup apparatus of the present invention, since the first objective lens is designed based on the image height priority design method against the light beams from the first light source, and the second objective lens is designed based on the image height priority design method against the light beams from the second light source as well, the sensitivity of coma adjustment against the incident light beams from the first light source is low, when the first objective lens is adjusted to suppress the coma aberration within a predetermined value. On the contrary, the coma adjustment sensitivity against the tilt angle of the first objective lens is high. Further, The sensitivity of coma adjustment against the incident light beams from the second light source is low, when the second objective lens is adjusted to suppress the coma aberration within a predetermined value. On the contrary, the coma adjustment sensitivity against the tilt of the second objective lens is high. Therefore, it becomes possible to suppress the coma aberration of the beams spot formed by light beams from either light source converged onto the information recording surface of the optical information recording medium, and to conduct the appropriate information recording and/or reproducing, by adjusting the tilt angle of the first objective lens when using the light beams from the first light source, and by adjusting the tilt angle of the first objective lens when using the light beams from the first light source. Further, since the second objective lens is designed based on the tilt angle priority design method against the light beams from the third light source, the coma aberration associated with the beam spot converged onto the information recording surface of the third optical information recording surface by using the light beams from the third light source also can be suppressed by adjusting the position of the third light source so that the shift amount of optical axis of the light beams of the third light source from the optical axis of the second objective lens. The coma aberration caused by the warp of the optical information recording medium, and the coma aberration caused by the residual tolerance due to the limitation of component tolerance and assembly tolerance can be suppressed in low level by applying the relative tilt angle changing device.

The third embodiment of the present invention is a method for assembling an optical pickup apparatus including, a first light source for emitting first light beams having wavelength of $\lambda 1$ (380 nm$\leq \lambda 1 \leq$450 nm), a second light source for emitting second light beams having wavelength of $\lambda 2$ (600 nm$\leq \lambda 2 \leq$700 nm), a third light source for emitting third light beams having wavelength of $\lambda 3$ (750 nm$\leq \lambda 3 \leq$850 nm), a first objective lens, a second objective lens, a lens holder for holding the first objective lens and the second objective lens, an actuator for driving the lens holder, an actuator base for supporting the actuator, and wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1$\leq$t2) of the second optical information recording medium via the second objective lens;

the third light beams from the third light source is applied to record and/or reproduce information onto/from a third optical information recording medium by converging the third light beams onto a information recording surface of the third optical information recording medium through a protective layer having thickness of t3 (t2$\leq$t3) of the third optical information recording medium;

the optical pickup apparatus is used in the an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing the relative tilt angle formed between the optical information recording medium and the objective lens;

the first objective lens is designed based on an image height priority design method against the first light beams, the image height design method being a design method for correcting a spherical aberration and a sine condition;

the second objective lens is designed based on a tilt angle priority design method against the second light beams, the tilt angle priority design method being a design method for correcting the spherical aberration while not correcting the sine condition; and the second objective lens is designed based on the image height priority design method against the third light beams, the method for assembling the optical pickup apparatus comprises the step of:

adjusting a first tilt angle of the actuator base so that a coma aberration of a spot formed by the first light beams decreases when the first light beams are converged onto the first recording medium via the first objective lens, adjusting a second tilt angle formed between the second objective lens and the lens holder so that a coma aberration of a beam spot formed by the third light beams decreases when the third light beams are converged onto the third recording medium via the second objective lens; and conducting a shift adjustment process for the second light source so that a coma aberration of a beam spot formed by the second light beams decreases when the second light beams are converged onto the second recording medium via the second objective lens.

According to the method for assembling the optical pickup apparatus of the present invention, since the first objective lens is designed based on the image height priority design method against the light beams from the first light source, and the second objective lens is designed based on the image height priority design method against the light beams from the third light source as well, the sensitivity of coma adjustment against the incident light beams from the first light source is low, when the first objective lens is adjusted to suppress the coma aberration within a predetermined value. On the contrary, the coma adjustment sensitivity against the tilt of the first objective lens is high. Further, The sensitivity of coma adjustment against the incident light beams from the third light source is low, when the second objective lens is adjusted to suppress the coma aberration within a predetermined value. On the contrary, the coma adjustment sensitivity against the tilt of the second objective lens is high. Therefore, it becomes possible to suppress the coma aberration of the beams spot formed by light beams from any one of light sources converged onto the information recording surface of the optical information recording medium, and to conduct the appropriate information recording and/or reproducing, by adjusting the tilt angle of the first objective lens when using the light beams from the first light source, and by adjusting the tilt angle of the second objective lens when using the light beams from the third light source. Further, since the second objective lens is designed based on the tilt angle priority design method against the light beams from the second light source, the coma aberration associated with the beam spot converged onto the information recording surface of the second optical information recording surface by using the light beams from the second light source also can be suppressed by adjusting the position of the second light source so that the shift amount of optical axis of the light beams of the second light source from the optical axis of the second objective lens. The coma aberration caused by the warp of the optical information recording medium, and the coma aberration caused by the residual tolerance due to the limitation of component tolerance and assembly tolerance can be suppressed in low level by applying the relative tilt angle changing device.

The fourth embodiment of the present invention is a method for assembling an optical pickup apparatus including, a first light source for emitting first light beams having wavelength of $\lambda 1$ (380 nm$\leq \lambda 1 \leq$450 nm), a second light source for emitting second light beams having wavelength of $\lambda 2$ (600 nm$\leq \lambda 2 \leq$700 nm), a third light source for emitting third light beams having wavelength of $\lambda 3$ (750 nm$\leq \lambda 3 \leq$850 nm), a first objective lens, a second objective lens, a lens holder for holding the first objective lens and the second objective lens, an actuator for driving the lens holder, an actuator base for supporting the actuator, and wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1$\leq$t2) of the second optical information recording medium via the second objective lens;

the third light beams from the third light source is applied to record and/or reproduce information onto/from a third optical information recording medium by converging the third light beams onto a information recording surface of the third optical information recording medium through a protective layer having thickness of t3 (t2$\leq$t3) of the third optical information recording medium;

the optical pickup apparatus is used in the an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing a relative tilt angle formed between the optical information recording medium and the objective lens;

the first objective lens is designed based on an image height priority design method against the first light beams, the image height design method being a design method for correcting a spherical aberration and a sine condition;

the second objective lens is designed based on a tilt angle priority design method against the second light beams, and the tilt angle priority design method against the third light beams, the tilt angle priority design method being a design method for correcting the spherical aberration while not correcting the sine condition, the method for assembling the optical pickup apparatus comprises the steps of:

adjusting a first tilt angle of the actuator base so that a coma aberration of a spot formed by the first light beams decreases when the first light beams are converged onto the first recording medium via the first objective lens, conducting a shift adjustment process for the second light source so that a coma aberration of a beam spot formed by the second light beams decreases when the second light beams are converged onto the second recording medium via the second objective lens; and conducting a shift adjustment process for the third light source so that a coma aberration of a beam spot formed by the third light beams decreases when the third light beams is converged onto the third recording medium via the second objective lens.

According to the method for assembling the optical pickup apparatus of the present invention, since the first objective lens is designed based on the image height priority design method against the light beams from the first light source, the sensitivity of coma adjustment against the incident light beams from the first light source is low, when the first objective lens is adjusted to suppress the coma aberration within a predetermined value. On the contrary, since the coma adjustment sensitivity against the tilt of the first objective lens is high, it becomes possible to suppress the coma aberration of the beams spot formed by light beams from the first light source converged onto the information recording surface of the first optical information recording medium, and to conduct the appropriate information recording and/or reproducing, by precisely adjusting the tilt angle of the first objective lens when using the light beams from the first light source. Further, since the second objective lens is designed based on the tilt angle priority design method against the light beams from the second and the third light source, the coma aberration associated with the beam spot converged onto the information recording surface of the second optical information recording surface by using the light beams from the second light source and the coma aberration associated with the beam spot converged onto the information recording surface of the third optical information recording surface by using the light beams from the third light source can be suppressed by adjusting the positions of the second light source and the third light source so that the shift amount of optical axis of the light beams of the second light source from the optical axis of the second objective lens, and the shift amount of optical axis of the light beams of the third light source from the optical axis of the second objective lens. The coma aberration caused by the warp of the optical information recording medium, and the coma aberration caused by the residual tolerance due to the limitation of component tolerance and assembly tolerance can be suppressed in low level by applying the relative tilt angle changing device. Moreover, since the shift adjusting processes of the second light source and the third light source are optically independent each other, any one of the adjustments can be carried out first.

The fifth embodiment of the present invention is a method for assembling an optical pickup apparatus including, a first light source for emitting first light beams having wavelength of $\lambda 1$ (380 nm$\leq\lambda 1\leq$450 nm), a second light source for emitting second light beams having wavelength of $\lambda 2$ (600 nm$\leq\lambda 2\leq$700 nm), a third light source for emitting third light beams having wavelength of $\lambda 3$ (750 nm$\leq\lambda 3\leq$850 nm), a first objective lens, a second objective lens, a lens holder for holding the first objective lens and the second objective lens, an actuator for driving the lens holder, an actuator base for supporting the actuator, and wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1$\leq$t2) of the second optical information recording medium via the second objective lens;

the third light beams from the third light source is applied to record and/or reproduce information onto/from a third optical information recording medium by converging the third light beams onto a information recording surface of the third optical information recording medium through a protective layer having thickness of t3 (t2$\leq$t3) of the third optical information recording medium;

the optical pickup apparatus is used in the an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing the relative tilt angle formed between the optical information recording medium and the objective lens;

the first objective lens is designed based on a tilt angle priority design method against the first light beams, the tilt angle priority design method being a design method for correcting the spherical aberration while not correcting the sine condition;

the second objective lens is designed based on an image height priority design method against the second and third light beams, the image height design method being a design method for correcting a spherical aberration and a sine condition, the method for assembling the optical pickup apparatus comprises the steps of:

adjusting a tilt angle of the actuator base so that a coma aberration of a spot formed by the second light beams decreases when the second light beams are converged onto the second recording medium via the second objective lens, and conducting a shift adjustment process for the first light source so that a coma aberration of a beam spot formed by the first light beams decreases when the first light beams are converged onto the first recording medium via the first objective lens.

According to the method for assembling the optical pickup apparatus of the present invention, since the second objective lens is designed based on the image height priority design method against the light beams from the second light source, the sensitivity of coma adjustment against the incident light beams from the second light source is low, when the second objective lens is adjusted to suppress the coma aberration within a predetermined value. On the contrary, since the coma adjustment sensitivity against the tilt of the second objective lens is high, it becomes possible to suppress the coma aberration of the beams spot formed by light beams from the second light source converged onto the information recording surface of the second optical information recording medium, and to conduct the appropriate information recording and/or reproducing, by precisely adjusting the tilt angle of the second objective lens when using the light beams from the second light source. Further, since the first objective lens is designed based on the tilt angle priority design method against the light beams from the first light source, the coma aberration associated with the beam spot converged onto the information recording surface of the first optical information recording surface by using the light beams from the first light source also can be suppressed by adjusting the position of the first light source so that the shift amount of optical axis of the light beams of the first light source from the optical axis of the first objective lens. The coma aberration caused by the warp of the optical information recording medium, and the coma aberration caused by the residual tolerance due to the limitation of component tolerance and assembly tolerance can be suppressed in low level by applying the relative tilt angle changing device.

The sixth embodiment of the present invention is a method for assembling an optical pickup apparatus including, a first light source for emitting first light beams having wavelength of $\lambda 1$ (380 nm$\leq\lambda 1\leq$450 nm), a second light source for emitting second light beams having wavelength of $\lambda 2$ (600 nm$\leq\lambda 2\leq$700 nm), a third light source for emitting third light beams having wavelength of $\lambda 3$ (750 nm$\leq\lambda 3\leq$850 nm), a first objective lens, a second objective lens, a lens holder for holding the first objective lens and the second objective lens, an actuator for driving the lens holder, an actuator base for supporting the actuator, and wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1≦t2) of the second optical information recording medium via the second objective lens;

the third light beams from the third light source is applied to record and/or reproduce information onto/from a third optical information recording medium by converging the third light beams onto a information recording surface of the third optical information recording medium through a protective layer having thickness of t3 (t2≦t3) of the third optical information recording medium;

the optical pickup apparatus is used in the an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing the relative tilt angle formed between the optical information recording medium and the objective lens;

the first objective lens is designed based on a tile angle priority design method against the first light beams, the tilt angle priority design method being a design method for correcting the spherical aberration while not correcting the sine condition; and the second objective lens is designed based on the image height priority design method against the second light source from the second light source and the tilt angle priority design method against the third light beams from the third light source, the image height design method being a design method for correcting a spherical aberration and a sine condition, the method for assembling the optical pickup apparatus comprises the steps of:

adjusting a tilt angle of the actuator base so that a coma aberration of a spot formed by the second light beams decreases when the second light beams are converged onto the second recording medium via the second objective lens, conducting a shift adjustment process for the first light source so that a coma aberration of a beam spot formed by the first light beams decreases when the first light beams are converged onto the first recording medium via the first objective lens; and conducting a shift adjustment process for the third light source so that a coma aberration of a beam spot formed by the third light beams decreases when the third light beams is converged onto the third recording medium via the second objective lens.

According to the method for assembling the optical pickup apparatus of the present invention, since the second objective lens is designed based on the image height priority design method against the light beams from the second light source the sensitivity of coma adjustment against the incident light beams from the second light source is low, when the second objective lens is adjusted to suppress the coma aberration within a predetermined value. On the contrary, since the coma adjustment sensitivity against the tilt of the objective lens is high, it becomes possible to suppress the coma aberration of the beams spot formed by light beams from the second light source converged onto the information recording surface of the second optical information recording medium, and to conduct the appropriate information recording and/or reproducing, by precisely adjusting the tilt angle of the second objective lens when using the light beams from the second light source. Further, since the first objective lens is designed based on the tilt angle priority design method against the light beams from the first, and the second objective lens is designed based on the tilt angle priority design methods against the third light source, the coma aberration associated with the beam spot converged onto the information recording surface of the first optical information recording medium, and the coma aberration associated with the beam spot converged onto the information recording surface of the third optical information recording medium by using the light beams from the third light source can be suppressed by adjusting the positions of the first light source and the third light source so that the shift amount of optical axis of the light beams of the first light source from the optical axis of the first objective lens, and the shift amount of optical axis of the light beams of the third light source from the optical axis of the second objective lens. The coma aberration caused by the warp of the optical information recording medium, and the coma aberration caused by the residual tolerance due to the limitation of component tolerance and assembly tolerance can be suppressed in low level by applying the relative tilt angle changing device. Moreover, since the shift adjusting processes of the first light source and the third light source are optically independent each other, any one of adjustments can be carried out first.

The seventh embodiment of the present invention is a method for assembling an optical pickup apparatus including, a first light source for emitting first light beams having wavelength of $\lambda 1$ (380 nm$\leq \lambda 1 \leq$450 nm), a second light source for emitting second light beams having wavelength of $\lambda 2$ (600 nm$\leq \lambda 2 \leq$700 nm), a third light source for emitting third light beams having wavelength of $\lambda 3$ (750 nm$\leq \lambda 3 \leq$850 nm), a first objective lens, a second objective lens, a lens holder for holding the first objective lens and the second objective lens, an actuator for driving the lens holder, an actuator base for supporting the actuator, and wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1≦t2) of the second optical information recording medium via the second objective lens;

the third light beams from the third light source is applied to record and/or reproduce information onto/from a third optical information recording medium by converging the third light beams onto a information recording surface of the third optical information recording medium through a protective layer having thickness of t3 (t2≦t3) of the third optical information recording medium;

the optical pickup apparatus is used in the an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing the relative tilt angle formed between the optical information recording medium and the objective lens;

the first objective lens is designed based on a tilt angle priority design method against the first light beams, the tilt angle priority design method being a design method for correcting the spherical aberration while not correcting the sine condition; and the second objective lens is designed based on the tilt angle priority design method against the second light beams from the second light source and an image height priority design method for third light beams from the third light source, the image height design method being a design method for correcting a spherical aberration and a sine condition, the method for assembling the optical pickup apparatus comprises the steps of:

adjusting a tilt angle of the actuator base so that a coma aberration of a spot formed by the third light beams decreases when the third light beams are converged onto the third recording medium via the second objective lens, conducting a shift adjustment process for the first light source so that a coma aberration of a beam spot formed by the first light beams decreases when the first light beams are converged onto the first recording medium via the first objective lens; and conducting a shift adjustment process for the second light source so that a coma aberration of a beam spot formed by the second light beams decreases when the third light beams is converged onto the second recording medium via the second objective lens.

According to the method for assembling the optical pickup apparatus of the present invention, since the second objective lens is designed based on the image height priority design method against the light beams from the third light source the sensitivity of coma adjustment against the incident light beams from the third light source is low, when the second objective lens is adjusted to suppress the coma aberration within a predetermined value. On the contrary, since the coma adjustment sensitivity against the tilt of the second objective lens is high, it becomes possible to suppress the coma aberration of the beams spot formed by light beams from the third light source converged onto the information recording surface of the third optical information recording medium, and to conduct the appropriate information recording and/or reproducing, by precisely adjusting the tilt angle of the second objective lens when using the light beams from the third light source. Further, since the first objective lens is designed based on the tilt angle priority design method against the light beams from the first light source and the second objective lens is designed based on the tilt angle priority design method against the light beams from the second light source, the coma aberration associated with the beam spot converged onto the information recording surface of the first optical information recording surface, and the coma aberration associated with the beam spot converged onto the information recording surface of the second optical information recording medium by using the light beams from the second light source can be suppressed by adjusting the positions of the first light source and the second light source so that the shift amount of optical axis of the light beams of the first light source from the optical axis of the first objective lens, and the shift amount of optical axis of the light beams of the second light source from the optical axis of the second objective lens. The coma aberration caused by the warp of the optical information recording medium, and the coma aberration caused by the residual tolerance due to the limitation of component tolerance and assembly tolerance can be suppressed in low level by applying the relative tilt angle changing device. Moreover, since the shift adjusting processes of the first light source and the second light source are optically independent each other, any one of the adjustments can be carried out first.

The eight embodiment of the present invention is a method for assembling an optical pickup apparatus including, a first light source for emitting first light beams having wavelength of λ1 (380 nm≦λ1≦450 nm), a second light source for emitting second light beams having wavelength of λ2 (600 nm≦λ2≦700 nm), a third light source for emitting third light beams having wavelength of λ3 (750 nm≦λ3≦850 nm), a first objective lens, a second objective lens, a lens holder for holding the first objective lens and the second objective lens, an actuator for driving the lens holder, an actuator base for supporting the actuator, and wherein the first light beams from the first light source are applied to record and/or reproduce information onto/from a first optical information recording medium by converging the first light beams onto a information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto a information recording surface of the second optical information recording medium through a protective layer having thickness of t2 (t1≦t2) of the second optical information recording medium via the second objective lens;

the third light beams from the third light source is applied to record and/or reproduce information onto/from a third optical information recording medium by converging the third light beams onto a information recording surface of the third optical information recording medium through a protective layer having thickness of t3 (t2≦t3) of the third optical information recording medium;

the optical pickup apparatus is used in the an optical information recording-reproducing apparatus having a relative tilt angle changing device for changing a relative tilt angle formed between the optical information recording medium and the objective lens of the optical pickup;

the relative tilt angle changing device is arranged to be able to control a coma aberration associated with light beams converged onto the recording surface of the optical information recording medium by changing the relative tilt angle formed between the optical information recording medium and the objective lens;

the first objective lens is designed based on a tilt angle priority design method against the first light beams the tilt angle priority design method being a design method for correcting the spherical aberration while not correcting the sine condition; and the second objective lens is designed based on a tilt angle priority design method against the second and third light beams, the method for assembling the optical pickup apparatus comprises the steps of:

conducting a shift adjustment process for the first light source so that a coma aberration of a beam spot formed by the first light beams decreases when the first light beams are converged onto the first recording medium via the first objective lens;

conducting a shift adjustment process for the second light source so that a coma aberration of a beam spot formed by the second light beams decreases when the third light beams is converged onto the second recording medium via the second objective lens; and conducting a shift adjustment process for the third light source so that a coma aberration of a beam spot formed by the third light beams decreases when the third light beams is converged onto the third recording medium via the second objective lens.

According to the method for assembling the optical pickup apparatus of the present invention, since the first objective lens is designed based on the tilt angle priority design method against the light beams from the first light source and the second objective lens is designed based on the tilt angle priority design method against the light beams from the second and third light sources, the coma aberration associated with the beam spot converged onto the information recording surface of the optical information recording surface from any one of the light sources can be suppressed to suppress the shift amount of optical axis of the light beams from the first light source from the optical axis of the first objective lens, to suppress the shift amount of optical axis of the light beams from the second light source from the optical axis of the second and to suppress the shift amount of optical axis of the light beams from the third light source from the optical axis of the second. The coma aberration caused by the warp of the optical information recording medium, and the coma aberration caused by the residual tolerance due to the limitation of component tolerance and assembly tolerance can be suppressed in low level by applying the relative tilt angle changing device. Moreover, since the shift adjusting processes of the first light source, the second light source and the third light source are optically independent each other, either adjustment can be carried out first.

The ninth embodiment of the invention is the method for assembling the optical pickup apparatus of any one of embodiments 2-8, wherein the shift adjustment process is conducted by moving a light source to be adjusted in a direction being perpendicular to a reference optical pickup apparatus.

The tenth embodiment of the invention is the method for assembling the optical pickup apparatus of any one of embodiments 1-6, wherein the first light source and the second light source are included in a same package.

The eleventh embodiment of the invention is the method for assembling the optical pickup apparatus of any one of embodiments 1-3 and 5-7, wherein the second light source and the third light source are included in a same package.

The twelfth embodiment of the invention is the method for assembling the optical pickup apparatus of any one of embodiments 3-8, wherein the first light source and the second light source are included in a same package having an optical axis correcting element for changing an emitting direction of light beams from one of the first light beams or the second light beams, the optical axis correcting element being adjustably attached on the package, and the shift adjustment process is conducted by moving the optical axis correcting element in an optical axis direction or in a direction being perpendicular to the optical axis.

The thirteenth embodiment of the invention is the method for assembling the optical pickup apparatus of any one of embodiments 1-12, wherein the second light source and the third light source are included in a same package having an optical axis correcting element for changing an emitting direction of the light beams from one of the first light beams or the second light beams, the optical axis correcting element being adjustably attached on the package, and the shift adjustment process is conducted by moving the optical axis correcting element in an optical axis direction or in a direction being perpendicular to the optical axis.

The fourteenth embodiment of the invention is the method for assembling the optical pickup apparatus of embodiments 1, further comprises a separating device for separating a part of reflected light beams from at least two optical information recording media from the first, second and third optical information media;

a photo-detector for detecting the light beams; and an optical axis adjusting element arranged between the separating device and the photo-detector.

The fifteenth embodiment of the invention is the method for assembling the optical pickup apparatus of any one of embodiments 1-8, further comprises a diffraction grating for separating main beams emitted from the light source for recording and/or reproducing information; and sub-beams used for tracking error signals;

wherein the sub-beams are converged into a beam spot having an aberration of no more than 0.07 $\lambda$rms on an image recording surface of an optical information recording medium, where $\lambda$ represents a wavelength of the light beams of the light source.

The sixteenth embodiment of the invention is the method for assembling the optical pickup apparatus of any one of embodiments 1-3, wherein the lens holder having s supporting section including a part of spherical surface centering on a principal point of the first objective lens or the second optical lens.

The seventeenth embodiment of the invention is the method for assembling the optical pickup apparatus of any one of embodiments 1-3, wherein the lens holder holds an objective lens having a tilt angle to be adjusted in a non-contact state and the tilt angle is adjusted in the non-contact state, thereafter an adhesive is filled in a space formed between the lens holder and the objective lens whose tilt angle has been adjusted to fix the objective lens and the lens holder.

The eighteenth embodiment of the invention is the method for assembling the optical pickup apparatus of any one of embodiments 1-3, 16 or 18, wherein the lens holder has a concave section to avoid interference with an arm for supporting the objective lens to be adjusted when a tilt angle of the first objective lens or the second objective lens is adjusted.

The nineteenth embodiment of the invention is the method for assembling the optical pickup apparatus of any one of embodiments 1-18, wherein the relative tilt angle changing device is to incline the lens holder.

The twentieth embodiment of the invention is the method for assembling the optical pickup apparatus of any one of embodiments 1-18, wherein the relative tilt angle changing device is to incline an overall optical system including the objective lens and the light source.

The twenty-first embodiment of the invention is the method for assembling the optical pickup apparatus of any one of embodiments 1-18, Wherein the optical image information recording reproducing apparatus includes a spindle motor for rotating the optical information recording medium and the relative tilt angle changing device inclines the spindle motor.

The twenty-second embodiment of the invention is the optical pickup apparatus assembled by the first embodiment of the invention.

In this specification, in the narrow sense of the word, the objective lens represents a lens having a light converging action, the lens being arranged in the closest position to an optical information recording medium, opposed to an optical information recording medium set in an optical pickup apparatus, and in the broad sense of word, represents a lens capable of moving along the optical axis based on the driving force of an actuator.

In this specification, the first optical information recoding medium represents an optical disc in a high density DVD series, such as BD, HD DVD, and the second optical information recording medium represents an optical disc including read-only discs, such as DVD-ROM and DVD-Video, etc., and recording/reproducing discs, such as DVD-RAM, DVD-R and DVD-RW, etc. The third optical information recording medium represents a CD series optical disc, such as CD-R and CD-RW, etc. Further, with regard to the thickness of protective layer t1 of the first optical information recording medium and the thickness second optical information recording medium t2, they may satisfy t1=t2 or t1<t2.

According to the present invention, it becomes possible to provide the method of assembling an optical pickup apparatus, which enables to save time for assembling the optical pickup apparatus capable of appropriately recording and/or reproducing information onto/from three kinds of optical information recording media by combining three different light beams having different wavelengths and two types of objective lens, to save the assembly time.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE PREFERRED EMBODIMENTS

Figure 1A:
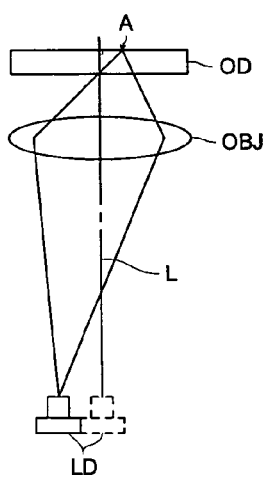
FIG. 1 illustrates systems structured by light source LD, objective lens OBJ and optical disc OD and drawings for describing "image height priority design method" and "tilt angle priority design method".
Figure 1B:
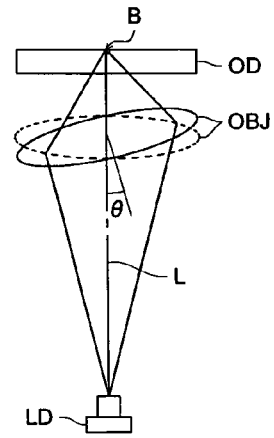
Figure 1C:
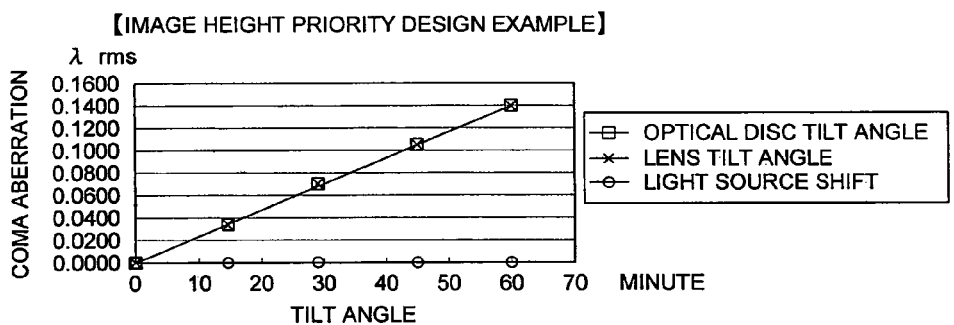
Figure 1D:
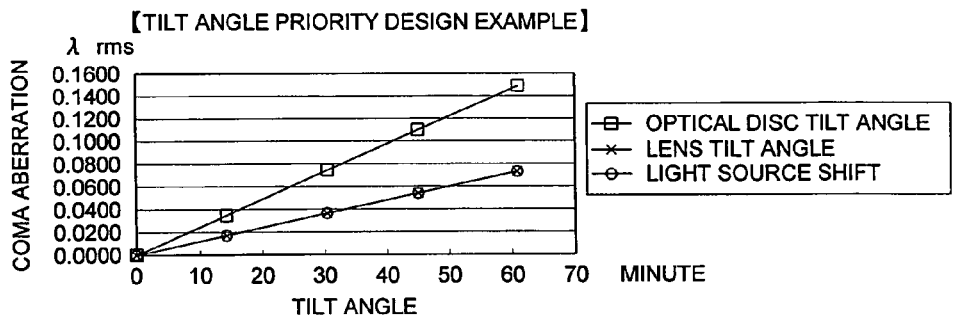
Figure 1E:
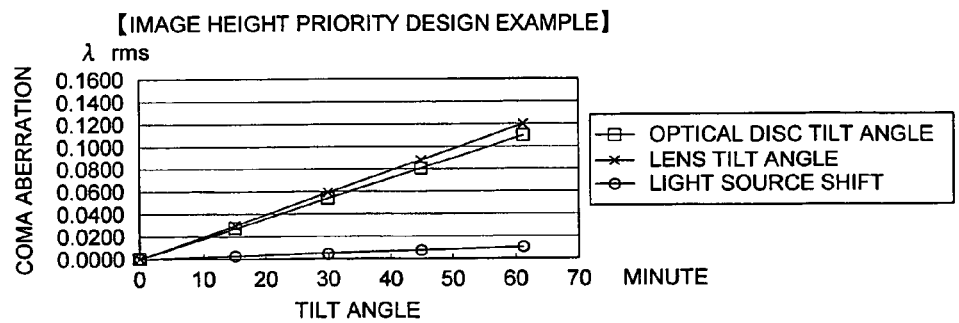
Figure 2:
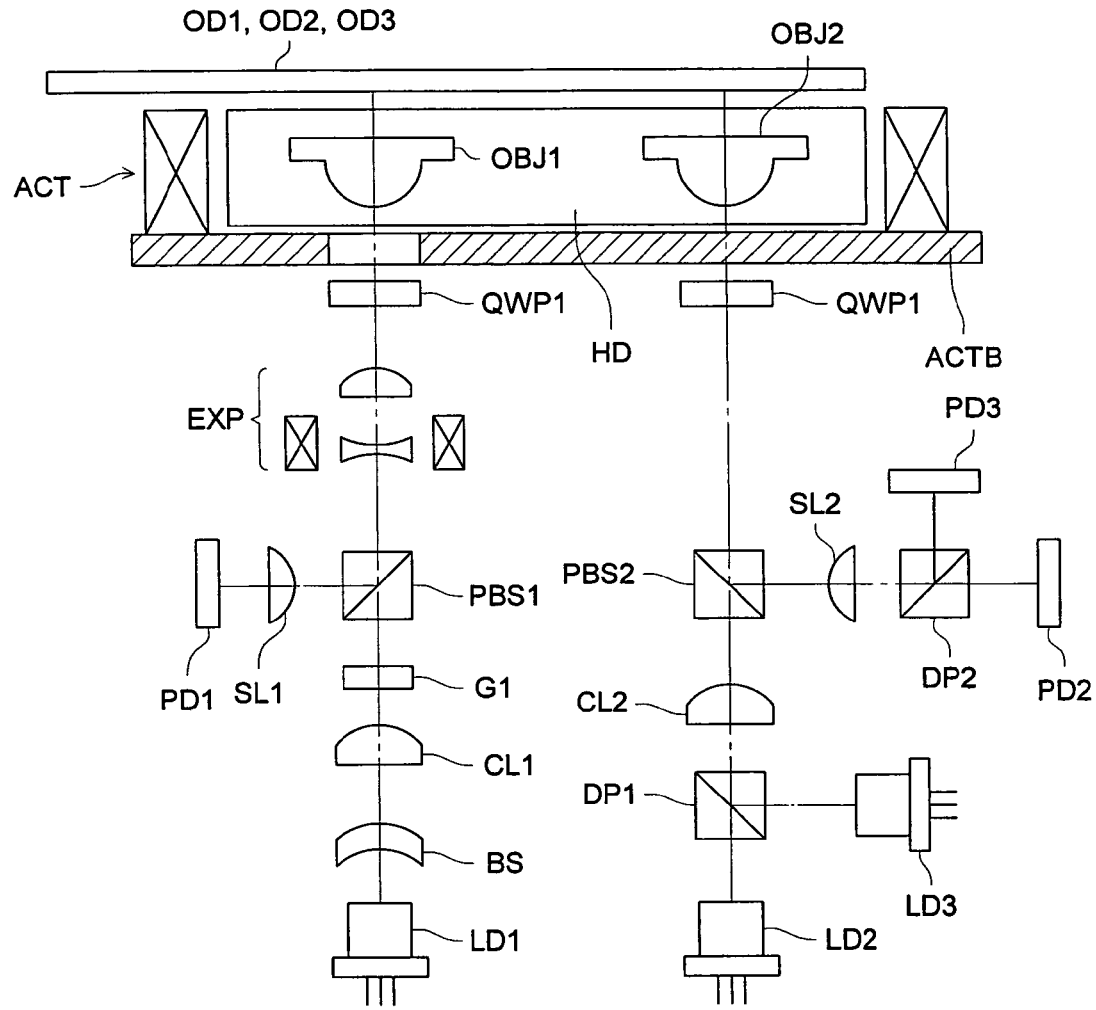
FIG. 2 illustrates a schematic sectional block diagram of the first embodiment of the invention.
Figure 3:
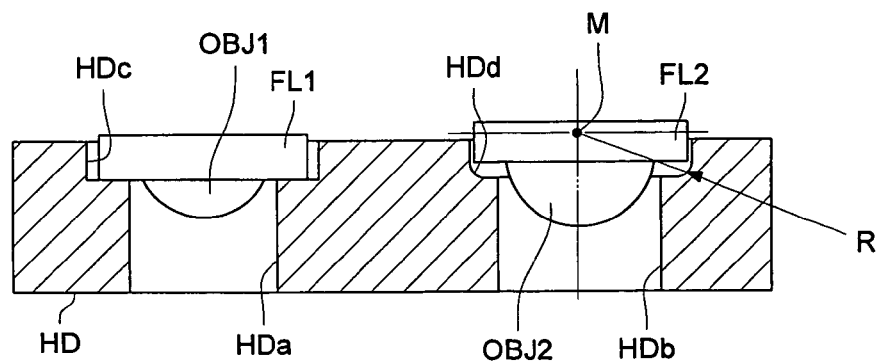
FIG. 3 illustrates a sectional view of a lens holder holding two objective lenses.

The present invention will be described in detail by referring to drawings below. FIG. 2 is a sectional block diagram of an optical pickup apparatus of the present invention capable of recording/reproducing information onto/from a high density DVD (it is also called the first optical disc), a conventional DVD (it is also called the second optical disc) and CD (it is also called the third optical disc). FIG. 3 is a sectional view of a lens holder holding two objective lenses.

In FIG. 3, lens holder HD has openings HDa and HDb, the axis line of the each opening is substantially parallel each other. Flange FL1 of object lens OBJ1 is attached onto counterbore HDc provided on the upper surface of the opening HDa so that the flange FL1 is in contact with the counterbore HDc. On the contrary, the internal surface of counterbore HDd provided on the upper surface of the opening HDb is formed in a spherical surface substantially centering on the primary point M of objective lens ObJ2. Flange FL2 of object lens OBJ2 is attached onto the lens holder HD so that the flange FL2 is in contact with the internal surface of the counterbore HDd.

Actuator ACT supports the lens holder HD so that the lens holder HD moves at least in two-dimensional directions. The actuator ACT comprises actuator base ACTB which is attached on the frame (now shown) of optical pickup apparatus so that actuator ACT can be moved to be adjusted against the frame. Further, with regard to the position of the objective lenses OBJ1 and OBJ2, it is not limited to the poison where FIG. 3 shows. An objective lens to be adjusted relative to the lens holder HD can be arranged in the opening HDb shown in the right side of the lens holder HD, which will be described later in the assembly method for an optical pickup apparatus.

When recording and/or reproducing information onto/from the first optical disc OD1, in FIG. 2, the light beams emitted from first semiconductor laser diode LD1 having wavelength of λ1=380 nm-450 nm, as a first light source, enter into first collimator lens CL1 after the beams shape is corrected while passing through beam shaper BS. The light beams emitted from the first collimator lens CL1 pass through first diffraction grating G1 being an optical device for separating sub-beam used as tracking error signals from main beams emitted from a light source for recording and/or reproducing information, first polarized beam splitter PBS1 and expander lens EXP. The expander EXP is arranged to move for changing the diameter of the light beams (here, the diameter is expanded). Here, the reason why the expander EXP is provided is not only to provide a function to correct a spherical aberration, but also to provide a function to select the information recording surface by moving the optical element along the optical axis.

The light beams passed through the expander lens EXP pass through first quarter wavelength plate QWP and form converged light spot onto the recording surface by the first object lens OBJ1 via protective layer having thickness t1=0.1-0.7 mm of the first optical disc OD1.

The light beams modulated by information pits formed on the information recording surface pass through the first objective lens OBJ1, the first quarter wavelength plate QWP1, the expander EXP, and are reflected by the first polarized beam splitter PBS1. Thereafter, since the light beams enter into detected surface of the first photo detector PD1 via the sensor lens SL1. As a result, signals, which were read from the first optical disc are obtained by using the output signals of the first photo detector PD1.

Focal point detection and track detection are conducted by detecting a beam spot shape change and the change of the amount of light due to the position change of the beam spot on the first photo-detector PD1. The actuator ACT is driven to move the first objective lens OBJ1 together with the lens holder HD so that the light beams from the first semiconductor laser LD1 converge onto the recording surface of the optical disc OD1.

When recording and/or reproducing information onto/from the second optical disc OD2, the beams emitted from the second semiconductor LD2 (having wavelength of λ2=600 nm-700 nm) converge on the information recording surface of the second optical disc OD2 through the second objective lens OBJ2 and the protective layer (having thickness of t2=0.5-0.7 mm), after that the beams pass through the first dichroic prism DP1; enter into second collimator lens CL2; pass through second diffraction grating G2, second polarized beam splitter PBS2 and second quarter wavelength plate QWP2.

Reflected light beams modulated by information pits on the information recording surface pass through the second objective lens OBJ2 and second quarter wavelength plate QWP2, and are reflected by second polarized beam splitter PBS2. Further the reflected beams transmit second sensor lens SL2 and second dichroic prism DP2 and enter into the detecting surface of second photo-detector PD2. As a result, information recorded on the second optical disc OD2 is obtained as read signals.

Focal point detection and track detection are conducted by detecting a beam spot shape change and the change of the amount of light due to the position change of the beam spot on second photo-detector PD2. The actuator ACT is driven to move the second objective lens OBJ2 together with the lens holder HD so that the light beams from the second semiconductor laser LD2 converge on the recording surface of the optical disc OD2.

When recording and/or reproducing information onto/from the third optical disc OD3, the beams emitted from second semiconductor LD3 (having wavelength of λ3=700 nm-800 nm) converge on the information recording surface of the third optical disc OD3 through the second objective lens OBJ2 and the protective layer (having thickness of t3=1.1-1.3 mm), after that the beams pass through first dichroic prism DP1; enter into the second collimator lens CL2; pass through the second diffraction grating G2, the second polarized beam splitter PBS2 and the second quarter wavelength plate QWP2.

Reflected light beams modulated by the information pits on the information recording surface pass through the second objective lens OBJ2 and the second quarter wavelength plate QWP2, and are reflected by the second polarized beam splitter PBS2. Further the reflected beams transmit the second sensor lens SL2 and the second dichroic prism DP2 and enter into the detecting surface of third photo-detector PD3. As a result, information recorded on the second optical disc OD3 is obtained as read signals.

Focal point detection and track detection are conducted by detecting the beam spot shape change and the change of the amount of light due to the position change of the beam spot on third photo-detector PD3. The actuator ACT is driven to move the second objective lens OBJ2 together with the lens holder HD so that the light beams from the third semiconductor laser LD3 converge on the recording surface of optical disc OD3.

A method of assembling an objective lens of the embodiment of the present invention will be described.

(1) When first objective lens OBJ1 is designed based on an image height priority design method against laser beams from the first semiconductor laser LD1, and the second objective lens OBJ2 is designed based on an image height priority design method against laser beams from the second and the third semiconductor laser LD2 and LD3:

Firstly, adjust the tilt of the optical axes of first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

In this situation, the first objective lens OBJ1 adheres to the lens holder HD and the second objective lens OBJ2 does not adhere to the lens holder HD. Then, adjusting the tilt of the actuator base ACTB (Namely, the first objective lens OBJ1) so that the value of the coma aberration of converged light beams becomes within a predetermined value when the first objective lens converges light beams from the first semiconductor laser LD1 converges onto the information recording surface of the first optical disc OD1.

Next, adjust the tilt of the second objective lens against the lens holder HD so that the coma aberration of converged light beam spot falls within a predetermined value when the second objective lens OBJ2 converges the light beams from the second semiconductor laser LD2 onto the information recording surface of the optical disc OD2. After that, adhere the second objective lens OBJ2 onto the lens holder HD. Still, with regard to the third semiconductor laser LD3, with which the adjustment has not been completed, use it under the condition of an initial adjustment, which is that an angular error against the optical axis is no more than 1°.

(2) When the first objective lens OBJ1 is designed based on an image height priority design method against laser beams from the first semiconductor laser LD1, and the second objective lens OBJ2 is designed based on an image height priority design method against laser beams from the second semiconductor laser LD2, and designed based on a tilt angle priority design method against laser beams from the third semiconductor laser LD3:

Firstly, adjust the tilt of the optical axes of the first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

In this situation, the first objective lens OBJ1 adheres to the lens holder HD and second objective lens does not adhere to the lens holder HD. Then, adjusting the tilt of the actuator base ACTB (Namely, the first objective lens OBJ1) so that the coma aberration falls within a predetermined value when the first objective lens OBJ1 converges light beams from the first semiconductor laser LD1 converges onto the information recording surface of the first optical disc OD1.

Next, adjust the tilt of the second objective lens against the lens holder HD so that coma aberration of the converged light beam spot falls within a predetermined value when the second objective lens OBJ2 converges the light beams from the second semiconductor laser LD2 onto the information recording surface of optical disc OD2. After that, adhere the second objective lens OBJ2 onto the lens holder HD.

Next, adjust the position of the third semiconductor laser LD3 in a direction being orthogonal to the optical axis of the third semiconductor laser LD3 so that coma aberration of the converged light beam spot falls within a predetermined value when the second objective lens OBJ2 converges the light beams from the third semiconductor laser LD3 onto the information recording surface of the third optical disc OD3. It is called a shift adjustment process.

(3) When the first objective lens OBJ1 is designed based on the image height priority design method against laser beams from the first semiconductor laser LD1; the second objective lens OBJ2 is designed based on the tilt angle priority design method against laser beams from the second semiconductor laser LD2 and designed based on the image height priority design method for laser beams from the third semiconductor laser LD3:

Firstly, adjust the tilt of the optical axes of the first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

In this situation, the first objective lens OBJ1 adheres to lens the holder HD and the second objective lens does not adhere to the lens holder HD. Then, adjusting the tilt of the actuator base ACTB (Namely, the first objective lens OBJ1) so that the coma aberration falls within a predetermined value when the first objective lens converges light beams from first semiconductor laser LD1 converges onto the information recording surface of the first optical disc OD1.

Next, adjust the tilt of second objective lens against lens holder HD so that coma aberration of the converged light beam spot falls within a predetermined value when second objective lens OBJ2 converges the light beams from third semiconductor laser LD3 onto the information recording surface of third optical disc OD3. After that, adhere second objective lens OBJ2 onto lens holder HD.

Next, adjust the position of the second semiconductor laser LD2 in a direction being orthogonal to the optical axis of second semiconductor laser LD2 so that a coma aberration of the converged light beam spot falls within a predetermined value when the second objective lens OBJ2 converges the light beams from the second semiconductor laser LD2 onto the information recording surface of the second optical disc OD2.

(4) When first objective lens OBJ1 is designed based on the image height priority design method against laser beams from the first semiconductor laser LD1; the second objective lens OBJ2 is designed based on a tilt angle priority design method against laser beams from the second semiconductor laser LD 2 and at the same time, designed based on the tilt angle priority design method for laser beams from the third semiconductor laser LD3:

Firstly, adjust the tilt of the optical axes of the first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

In this situation, the first objective lens OBJ1 and the second objective lens OBJ2 adhere to the lens holder HD. Then, adjusting the tilt of the actuator base ACTB (Namely, the first objective lens OBJ1) so that the coma aberration falls within a predetermined value when the first objective lens converges light beams from the first semiconductor laser. LD1 converges onto the information recording surface of the first optical disc OD1. It is also possible to adjust the tilt of first objective lens against the lens holder HD, not the actuator base ACTB. In this case, it is not necessary to say that prior to this adjustment, the first objective lens OBJ1 should not adhere on the lens holder HD.

Next, adjust the position of the second semiconductor laser LD2 in a direction which is orthogonal to the optical axis so that coma aberration of the converged light beam spot falls within a predetermined value when the second objective lens OBJ2 converges the light beams from the third semiconductor laser LD3 onto the information recording surface of the third optical disc OD3.

Next, adjust the position of the third semiconductor laser LD3 in a direction being orthogonal to the optical axis of the third semiconductor laser LD3 so that the coma aberration of the converged light beam spot falls within a predetermined value when the second objective lens OBJ2 converges the light beams from the third semiconductor laser LD3 onto the information recording surface of the third optical disc OD2.

The semiconductor laser LD1, the second semiconductor laser LD2, the third semiconductor laser LD3, the first objective lens OBJ1 and the second objective lens OBJ2 are attached in the optical pickup apparatus and adjusted so that the tilt of each optical axis against the reference optical axis of an optical pickup apparatus is set within 1°.

(5) When the first objective lens OBJ1 is designed based on a tilt angle priority design method against laser beams from the first semiconductor laser LD1; the second objective lens OBJ2 and the third objective lens OBJ3 are designed based on the image height priority design method against laser beams from the second semiconductor laser LD 2 and laser beams from the third semiconductor laser LD3 respectively:

Firstly, adjust the tilt of the optical axes of the first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

In this situation, the first objective lens OBJ1 and the second objective lens OBJ2 adhere to the lens holder HD. Then, adjusting the tilt of the actuator base ACTB (Namely, the second objective lens OBJ2) so that the coma aberration falls within a predetermined value when the second objective lens converges light beams from the second semiconductor laser LD2 converges onto the information recording surface of second optical disc OD2. It is also possible to adjust the tilt of second objective lens against lens holder HD, not actuator base ACTB. In this case, it is not necessary to say that prior to this adjustment, second objective lens OBJ2 should not adhere on lens holder HD.

Next, adjust the position of the first semiconductor laser LD1 in a direction which is orthogonal to the optical axis so that coma aberration of the converged light beam spot falls within a predetermined value when the first objective lens OBJ1 converges the light beams from the first semiconductor laser LD1 onto the information recording surface of the first optical disc OD1.

(6) When first objective lens OBJ1 is designed based on a tilt angle priority design method against laser beams from the first semiconductor laser LD1; the second objective lens OBJ2 is designed based on an image height priority design method against laser beams from the second semiconductor laser LD 2 and at the same time, designed based on the tilt angle priority design method for laser beams from the third semiconductor laser LD3:

Firstly, adjust the tilt of the optical axes of the first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

The first objective lens OBJ1 and the second objective lens OBJ2 adhere to the lens holder HD. Then, adjusting the tilt of the actuator base ACTB (Namely, the second objective lens OBJ2) so that the coma aberration falls within a predetermined value when the second objective lens converges light beams from the second semiconductor laser LD2 converges onto the information recording surface of the second optical disc OD2. It is also possible to adjust the tilt of the second objective lens against lens holder HD, not the actuator base ACTB. In this case, it is not necessary to say that prior to this adjustment, the second objective lens OBJ2 should not adhere on the lens holder HD.

Next, adjust the position of the third semiconductor laser LD3 in a direction which is orthogonal to the optical axis so that coma aberration of the converged light beam spot falls within a predetermined value when the second objective lens OBJ2 converges the light beams from the third semiconductor laser LD3 onto the information recording surface of the third optical disc OD3.

Further, adjust the position of the first semiconductor laser LD1 in a direction which is orthogonal to the optical axis so that coma aberration of the converged light beam spot falls within a predetermined value when the first objective lens OBJ1 converges the light beams from the first semiconductor laser LD1 onto the information recording surface of the first optical disc OD1.

(7) When the first objective lens OBJ1 is designed based on the tilt angle priority design method against laser beams from the first semiconductor laser LD1; the second objective lens OBJ2 is designed based on the tilt angle priority design method against laser beams from the second semiconductor laser LD 2 and at the same time, designed based on an image height priority design method for laser beams from the third semiconductor laser LD3:

Firstly, adjust the tilt of the optical axes of the first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

The first objective lens OBJ1 and the second objective lens OBJ2 adhere to lens holder HD. Then, adjust the tilt of the actuator base ACTB (Namely, the second objective lens OBJ2) so that the coma aberration falls within a predetermined value when the second objective lens converges light beams from the third semiconductor laser LD3 onto the information recording surface of the third optical disc OD3. It is also possible to adjust the tilt of the second objective lens against lens holder HD, not the actuator base ACTB. In this case, it is not necessary to say that prior to this adjustment, the second objective lens OBJ2 should not adhere on lens holder HD.

Next, adjust the position of the second semiconductor laser LD2 in a direction which is orthogonal to the optical axis so that coma aberration of the converged light beam spot falls within a predetermined value when the second objective lens OBJ2 converges the light beams from the second semiconductor laser LD2 onto the information recording surface of the second optical disc OD2.

Further, adjust the position of the first semiconductor laser LD1 in a direction which is orthogonal to the optical axis so that coma aberration of the converged light beam spot falls within a predetermined value when the first objective lens OBJ1 converges the light beams from the first semiconductor laser LD1 onto the information recording surface of the first optical disc OD1.

(8) When the first objective lens OBJ1 is designed based on the tilt angle priority design method against laser beams from the first semiconductor laser LD1; the second objective lens OBJ2 is designed based on the tilt angle priority design method against laser beams from the second semiconductor laser LD 2 and laser beams from the third semiconductor laser LD3:

Firstly, adjust the tilt of the optical axes of the first semiconductor laser LD1, the second semiconductor laser LD2, the third semiconductor laser LD3, the first objective lens OBJ1 and the second objective lens OBJ2 so that the tilt of each optical axis against the reference optical axis of an optical pickup apparatus is set within 1°.

Next, adjust the position of the third semiconductor laser LD3 in a direction which is orthogonal to the optical axis so that coma aberration of the converged light beam spot falls within a predetermined value when the first objective lens OBJ1 converges the light beams from the first semiconductor laser LD1 onto the information recording surface of the first optical disc OD1.

Further, adjust the position of the second semiconductor laser LD2 in a direction which is orthogonal to the optical axis so that coma aberration of the converged light beam spot falls within a predetermined value when the second objective lens OBJ2 converges the light beams from second semiconductor laser LD2 onto the information recording surface of the second optical disc OD2.

Further, adjust the position of the third semiconductor laser LD3 in a direction which is orthogonal to the optical axis so that coma aberration of the converged light beam spot falls within a predetermined value when the second objective lens OBJ2 converges the light beams from the third semiconductor laser LD3 onto the information recording surface of the third optical disc OD3. In addition to this example, with regard to the order of the adjustment, total six orders, such as LD1-LD3-LD2, LD2-LD1-LD3, LD2-LD3-LD1, LD2-LD3-LD1, LD3-LD1-LD2 and LD3-LD2-LD1 are available and any order of adjustment may be applicable.

The coma aberration of the light beams spot to which the light beams emitted form each semiconductor are converged can be suppressed based on the adjustment described above. However, in this embodiment, driving a relative tilt angle changing device in response to the signal from an photodetector corrects the coma aberration caused by warp of a disc and the coma aberration caused by residual error. Still, it is possible to reduce the load of the relative tilt angle changing device in an actual operation of the optical pickup by adjusting the coma aberration when assembling the optical pickup. As a result, the miniaturization, the energy saving and the reduction of cost of the tilt angle changing mechanism can be attained.

Figure 12:
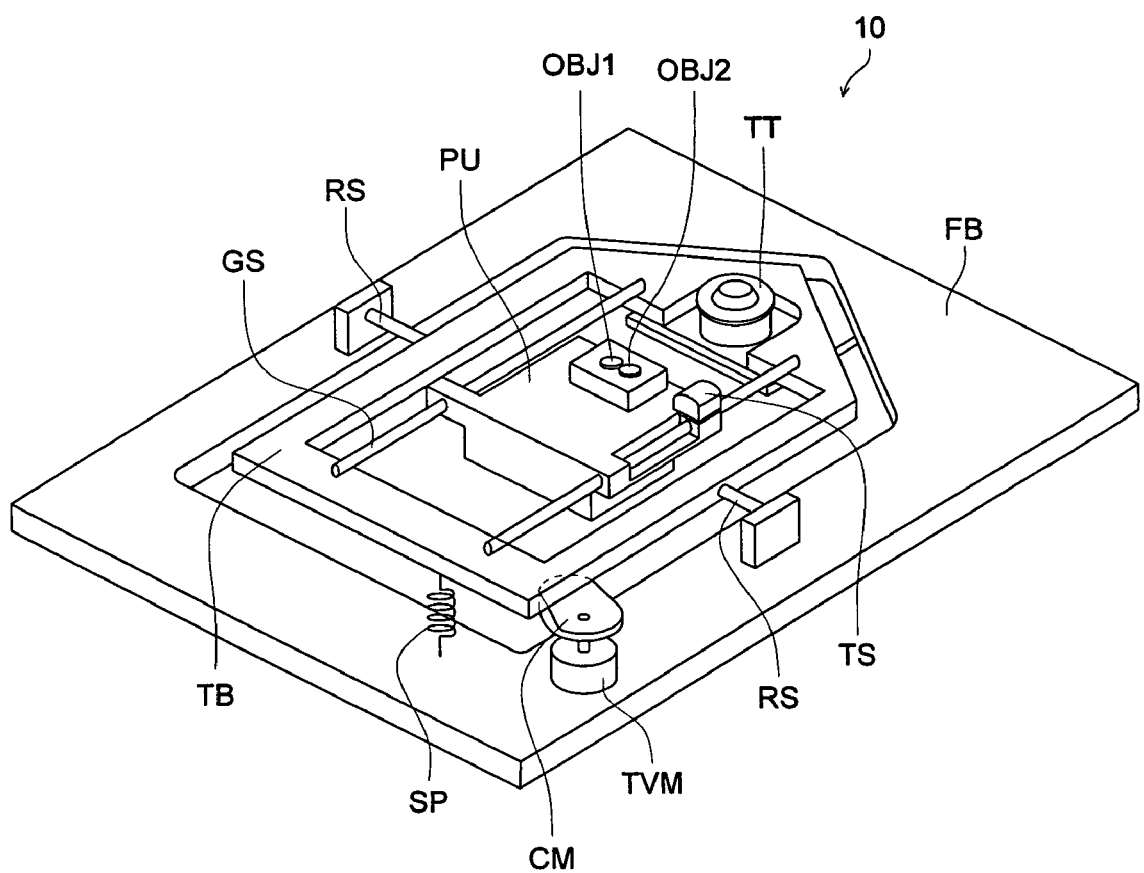
FIG. 12 illustrates a perspective view of tilt angle changing mechanism 10 for adjusting the tilt of the objective lens by changing the tilt of the optical pickup apparatus.

Tilt angle changing mechanism 10 as a relative tilt angle changing device will be described here. FIG. 12 is a side view of the tilt angle changing mechanism 10 for adjusting the tilt angle of optical pickup itself with objective lenses OBJ1 and OBJ2. In FIG. 12, an optical disc is hold on turntable TT by a magnetic clamp (not shown) and rotated by spindle motor SM attached on fixed base FB. Tilt angle changing motor TVM with which cam CM is provided on the fixed base FB and driven by a driving power supply (not shown).

Optical pickup PU is held on guide shaft GS fixed on tilt base TB and arranged to be moved by a moving mechanism (not shown) in the radius direction of an optical disc to be read by the optical pickup PU. The tilt base TB is held via rotary shaft RS so that the tilt base TB can freely rotates around the rotary shaft RS, and pushed toward slant changing mechanism cam CM by suspension SP. When recording and/or reproducing, the tilt sensor TS detects the tilt angle of the optical disc and the tilt angle changing motor TVM rotates cam CM to tilt the tilt-base TB in response to the detected result of the tilt sensor TS. As a result, the relative tilt angle formed between the optical disc and the optical pickup apparatus PU (namely, an objective lens) can be changed. Consequently, the coma aberration of the light beams converged on the information recording surface of the optical disc can be controlled.

This method is effective no matter which design method selected from the image height priority design method and the tilt angle design method, since this method is to change relative tilt angle between the optical disc and the optical pickup apparatus. The tilt angle changing mechanism for tilting the optical pickup apparatus is not limited to this method described above. There are many other systems has been proposed, such as Japanese Patent Application Publication H09-91731.

Figure 13:
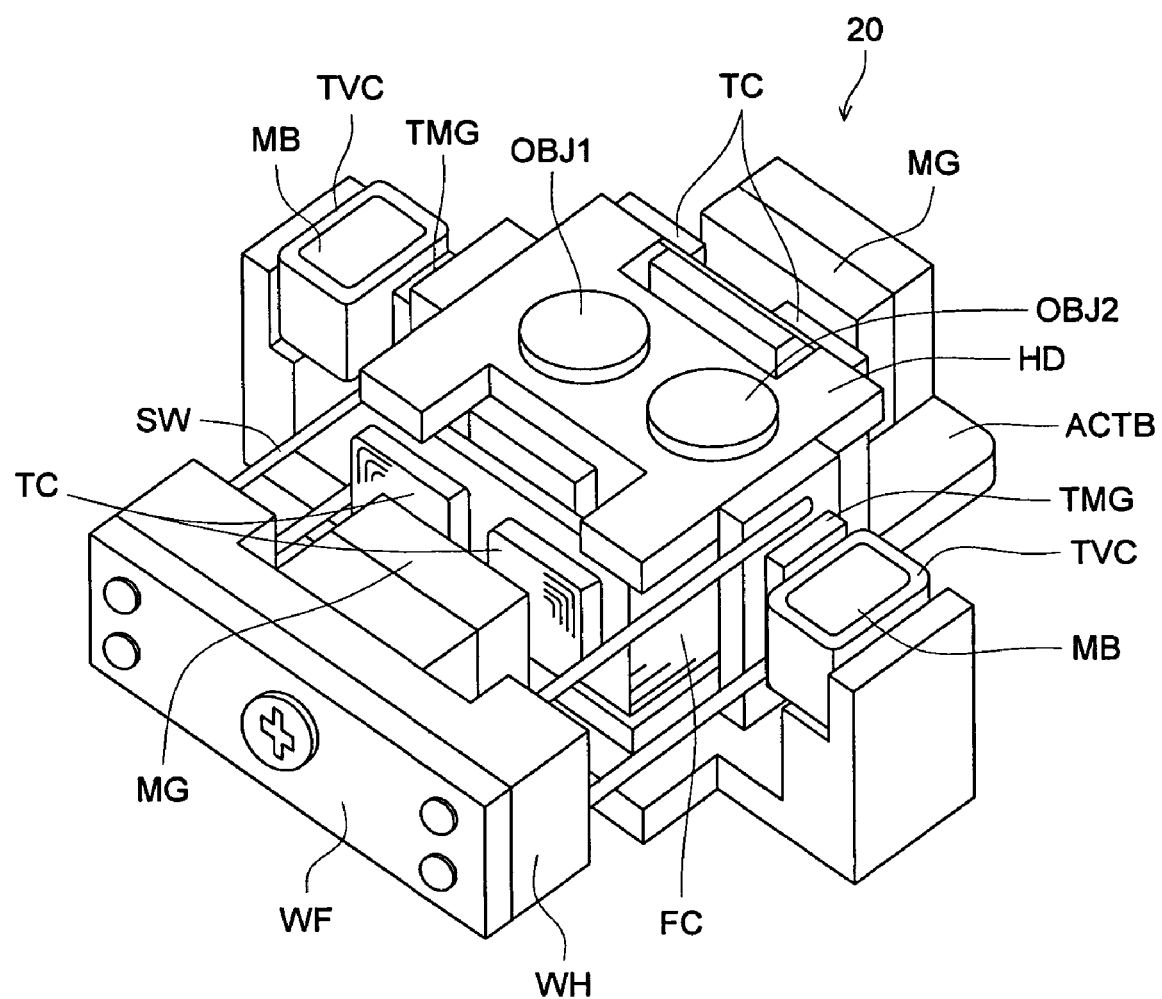
FIG. 13 illustrates a perspective view of tilt angle changing mechanism 20 for changing the tilt angle of the objective lens by changing the tilt angle of the lens holder.

Tilt angle changing mechanism 20 will be described as the other example of a relative tilt angle changing device. FIG. 13 illustrates a perspective view of the tilt angle changing mechanism 20 for changing the tilt angle of the objective lens by changing the tilt angle of the lens holder. In FIG. 13, the objective lenses OBJ1 and OBJ2 are adhered and fixed on the lens holder HD. The lens holder HD is held by suspension wire SW on the actuator base ACTB via wire holder WH for a holding damping member and wire fixing board WF. Focusing coil FC and tracking coil TC are fixed on the Lens holder HD and structures a magnetic circuit together with the actuator base ACTB which works also as a yoke and magnet MG fixed on the actuator base ACTB. It is possible to simultaneously move the lens holder HD in the focusing direction and the tracking direction by flowing a current through into focusing coil FC and tracking coil TC by applying a driving power supply (not shown).

Two tilt angle changing magnet TMG(s) are fixed on the lens holder HD. Two tilt angle changing coil TVC(s) are wound around a magnetic material and fixed to the actuator base ACTB so as to oppose to each other. These components form a magnetic circuit. The lens holder HD can be inclined by controlling the current direction in the tilt angle changing coil TVC so that two magnetic circuits generate driving forces having up and down directions. The coma aberration of the light beams converged on the information recording surface of the optical disc can be controlled base on this configuration described above.

Since this system is designed to change the relative tilt angle between the optical disc and the objective lens, it is specifically effective when the objective lens is designed based on the image height priority design method in which the coma aberration sensitivity is high. The tile angle changing mechanism for tilting a lens holder of an actuator is not limited to this embodiment, but various systems have been proposed, for example, Japanese Patent Application No. H10-278354, which has disclosed details.

Figure 14:
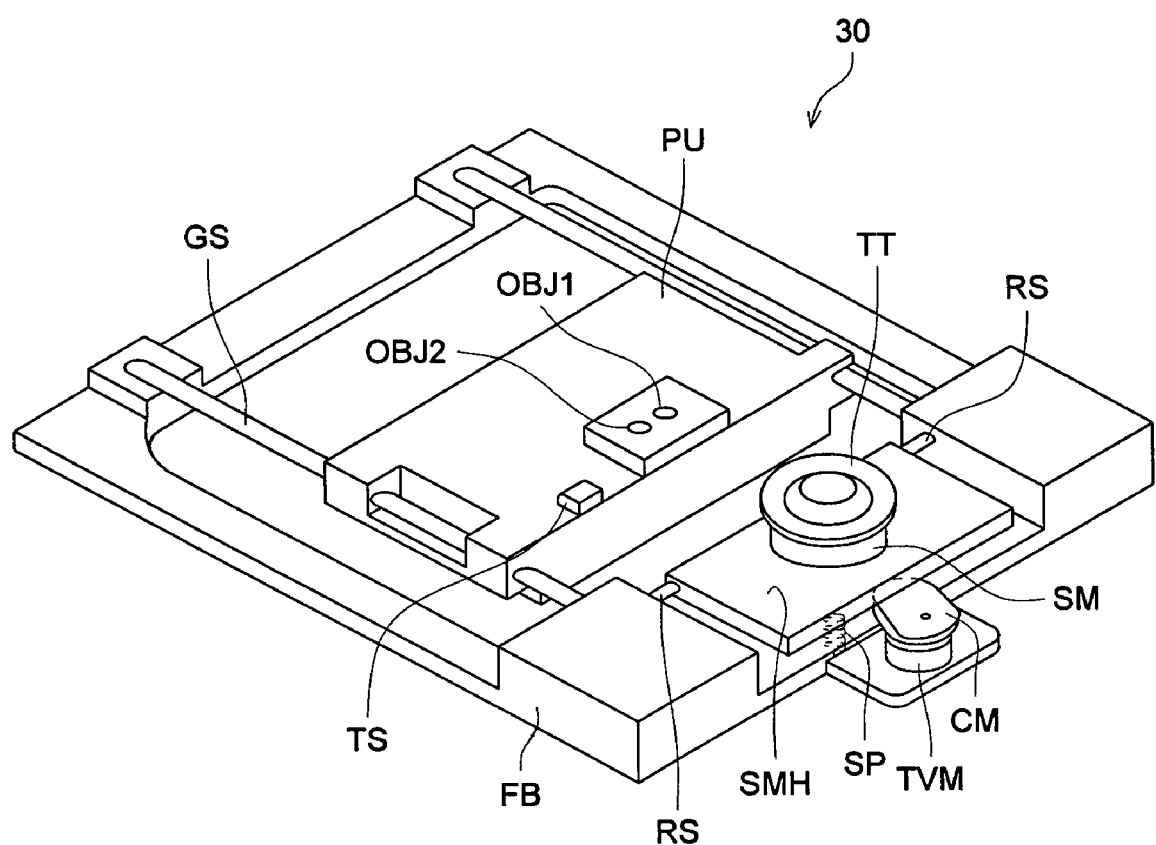
FIG. 14 illustrates a perspective view of tilt angle changing mechanism 10 for adjusting the tilt of the objective lens by changing the tilt of the optical pickup apparatus.

Tilt angle changing mechanism 30 as another example of the relative tilt angle changing device will be described. FIG. 14 is a perspective view of the tilt angle changing mechanism 30 for tilting the objective lens together with the optical pickup apparatus. In FIG. 14, the optical disc is held on turntable TT by a magnetic clamp which is not shown, and driven by spindle motor SM fixed on spindle motor holder SMH. The optical pickup apparatus is held on the guide shaft GS fixed on fixed base FB and arranged to be capable of moving by a moving mechanism being not shown in the radius direction of the optical disc. The tilt angle changing motor TVM with which the cam CM is fixed, is attached on the fixed base FB and is driven by a driving power supply which is not shown. The spindle motor holder SMH is held on the fixed base FB via rotary shaft RS so that the spindle motor holder SHM freely rotates around the rotary shaft RS, and pushed by spring SP to the cam CM. When recording and/or reproducing, the relative tilt angle between the optical disc and the optical pickup apparatus PU (namely the objective lens) can be adjusted by rotating the cam CM based on the rotation of the tilt angle changing motor TVM to tilt the spindle motor holder SMH in response to the detected result based on the detection of the tilt angle of the optical disc by tilt sensor TS. The coma aberration of the light beams converged on the recording surface of the optical pickup can be controlled based on this described above.

This system is effective, since the relative tilt angel formed between the optical disc and the optical pickup apparatus is changed. It is not concerned whether or not the objective les has been designed by the image height priority design method or the tilt angle priority design method. The tilt angle changing mechanism for tilting the spindle motor is not limited to this embodiment. As another example, for example, Japanese Patent Application No. H9-282692 has disclosed details.

Further, according to the embodiment of the present invention, since an objective lens dedicated to the first semiconductor laser and an objective lens being used by the second semiconductor laser and the third semiconductor laser are provided, optical design margin for the image formation performance associated wit each optical disc corresponding to each wavelength is generated. Particularly, according this embodiment, the thickness of the lens and working distance can be designed small. As a result, it becomes effective when designing a thin optical pickup apparatus. Further, since the aberration margin of the objective lens becomes large, the aberration of other optical elements in the optical pickup can be eased. It becomes possible to design optical elements suitable for mass production without requiring sever mechanical accuracies on structural parts of the optical pickup apparatus and lower the cost.

Figure 4:
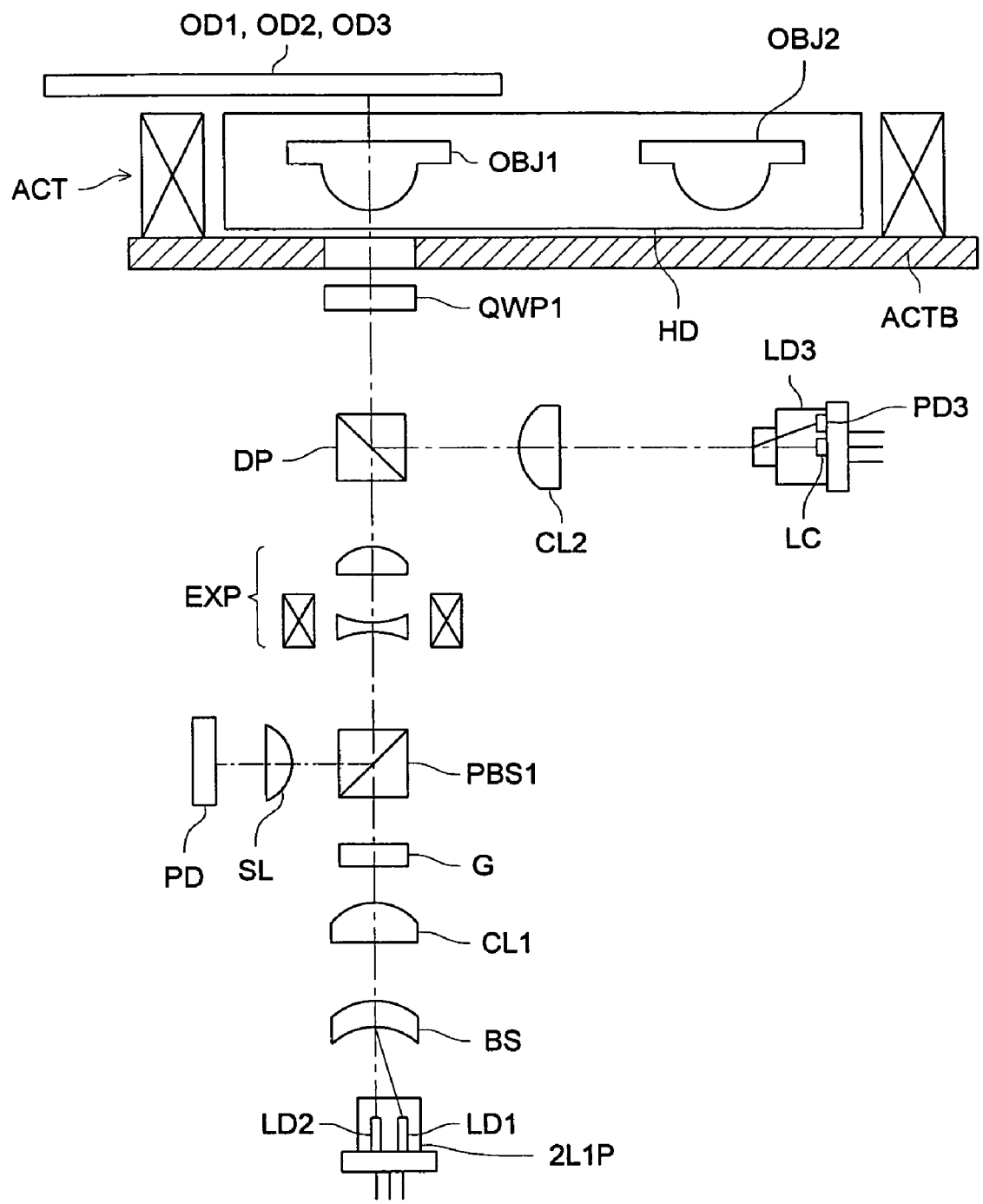
FIG. 4 illustrates a schematic sectional block diagram of optical pickup apparatus of the invention.

FIG. 4 shows a schematic cross sectional view of the second embodiment of an optical pickup apparatus capable of recording and/or reproducing information onto/from a high density DVD (the first optical disc), a conventional DVD (the second optical disc) and a CD (third optical disc). In this embodiment, first semiconductor laser LD1 and second semiconductor laser LD2 are packaged into one package, so called 2-laser-1-package 2L1P.

The supporting system of the objective lens onto the lens holder HD is the same system of the embodiment described above (refer to FIG. 3). As shown in FIG. 4, the lens holder HD is supported by actuator ACT so that the lens holder HD at least two-dimensionally moves. The actuator ACT includes actuator base ACTB capable of being relatively moved to the frame (not shown) of the optical pickup apparatus. The lens holder HD for supporting the objective lens is capable of rotating on the axis being extending substantially parallel to the optical axes and axis is positioned in the mid-position between two objective lens. When recording and/or reproducing information onto/from the first optical disc OD1, as shown in FIG. 4, the lens holder HD rotates so that the light beams passing through quarter wavelength plate QWP enter into the first objective lens OD1. When recording and/or reproducing information onto/from the second optical disc OD2 or the third optical disc OD3, the lens holder HD rotates so that the light beams passing through the quarter wavelength plate QWP enter into the second objective lens OD2.

When recording and/or reproducing information onto/from the first optical disc OD1, the lens holder HD is rotated to the position as shown in FIG. 4. In FIG. 4, the light beams emitted from the first semiconductor laser LD1 (wavelength of $\lambda 1$=380 nm-450 nm) enter into first collimator lens CL1 after passing through beam-shaper BS, whereby the shape of the light beams is corrected. The light beams outputted from the first collimator lens CL1 pass through diffraction grating G for separating the light beams emitted from the light beam source into main beams for recording/reproducing and sub-beams for tracking error detecting signals, polarized beam splitter PBS and expander EXP.

The light beams passed through expander EXP is converged by the first objective lens OBJ1 on the information recording surface to form a light beam spot after passing through dichroic-prism DP, the quarter wavelength plate QWP and the protective layer (thickness t1=0.1-0.7 mm) of the first optical disc OD1.

The light beams modulated by information pits formed on the information recording surface pass through the first objective lens OBJ1, the quarter wavelength plate QWP1, the expander EXP, and are reflected by the first polarized beam splitter PBS1. Thereafter, since the light beams enter into detected surface of the photo detector PD via the sensor lens SL. As a result, signals which were read from the first optical disc OD1 are obtained by using the output signals of the first photo detector PD1.

Focal point detection and track detection are conducted by detecting a beam spot shape change and the change of the amount of light due to the position change of the beam spot on the photo-detector PD. The actuator ACT is driven to move the first objective lens OBJ1 together with the lens holder HD so that the light beams from the first semiconductor laser LD1 converge onto the recording surface of the optical disc OD1.

When recording and/or reproducing information onto/from the second optical disc OD2, the lens holder HD is rotated to the position as shown in FIG. 4. In FIG. 4, the light beams emitted from the second semiconductor laser LD1 (wavelength of $\lambda 2$=600 nm-700 nm) enter into the first collimator lens CL1 after passing through beam-shaper BS, whereby the shape of the light beams is corrected. The light beams outputted from the first collimator lens pass through diffraction grating G for separating the light beams emitted from the light beam source into main beams for recording/reproducing and sub-beams for tracking error detecting signals, polarized beam splitter PBS and expander EXP.

The light beams passed through the expander EXP is converged by the second objective lens OBJ2 on the information recording surface to form a light beam spot after passing through dichroic-prism DP, the quarter wavelength plate QWP and the protective layer (thickness of t1=0.1-0.7 mm) of the second optical disc OD2.

The light beams modulated by information pits formed on the information recording surface pass through the second objective lens OBJ2, the quarter wavelength plate QWP1, the expander EXP, and are reflected by the first polarized beam splitter PBS1. Thereafter, since the light beams enter into detected surface of the photo detector PD via the sensor lens SL. As a result, signals which were read from the second optical disc are obtained by using the output signals of the first photo detector PD1.

Focal point detection and track detection are conducted by detecting a beam spot shape change and the change of the amount of light due to the position change of the beam spot on the photo-detector PD. The actuator ACT is driven to move the second objective lens OBJ2 together with the lens holder HD so that the light beams from the second semiconductor laser LD2 converge onto the recording surface of the second optical disc 0D2.

The third semiconductor laser is hologram laser and laser chip LC and photo-detector PD3 are packaged into one package. A case that information is recorded and/or reproduced onto/from the third optical disc OD3 will be described. The light beams emitted from the laser chip of the third laser LD3 (wavelength of $\lambda 3$=700 nm-800 nm) are converged to form a light beam spot onto the information recording surface through the protective layer (thickness of t3=1.1-1.3 mm) after passing through the second collimator lens CL2, whereby the divergent angle of the light beams are changed, and being reflected by the dichroic prism DP.

The light beams modulated by information pits formed on the information recording surface pass through the second objective lens OBJ2, the quarter wavelength plate QWP, and are reflected by the dichroic prism PD. Thereafter, the light beams enter into detected surface of the photo detector PD in the third laser LD3. As a result, signals which were read from the first optical disc are obtained by using the output signals of the first photo detector PD1.

Focal point detection and track detection are conducted by detecting a beam spot shape change and the change of the amount of light due to the position change of the beam spot on the third photo-detector PD3. The actuator ACT is driven to move the second objective lens OBJ2 together with the lens holder HD so that the light beams from the third semiconductor laser LD3 converge onto the recording surface of the third optical disc OD3.

Since 2-laser-1-package, which includes the first laser LD1 and the second laser LD2, is used in this embodiment, these light sources cannot be independently adjusted. Consequently, when assembling the optical pickup apparatus, the adjustments described in from (1) to (6) may be conducted.

The coma aberration of the light beams spot formed by the light beams emitted from each semiconductor can be suppressed based on the adjustment described above. However, in this embodiment, driving a relative tilt angle changing device in response to the signal from an photo-detector corrects the coma aberration caused by warp of a disc and the coma aberration caused by residual error. Further, it is possible to reduce the load of the relative tilt angle changing device in an actual operation of the optical pickup by adjusting the coma aberration when assembling the optical pickup apparatus. As a result, the reduction of cost of the tilt angle changing mechanism, the miniaturization and the energy saving can be attained.

Further, according to the embodiment of the present invention, since an objective lens dedicated to the first semiconductor laser and an objective lens being used by the second semiconductor laser and the third semiconductor laser are provided, optical design margin for the image formation performance associated with each optical disc corresponding to each wavelength is generated. Particularly, according to this embodiment, the thickness of the lens and working distance can be designed small. As a result, it becomes effective when designing a thin optical pickup apparatus. Further, since the aberration margin of the objective lens becomes large, the aberration of other optical elements in the optical pickup can be eased. It becomes possible to design optical elements suitable for mass production without requiring sever mechanical accuracies on structural parts of the optical pickup apparatus and lower the cost.

Figure 5:
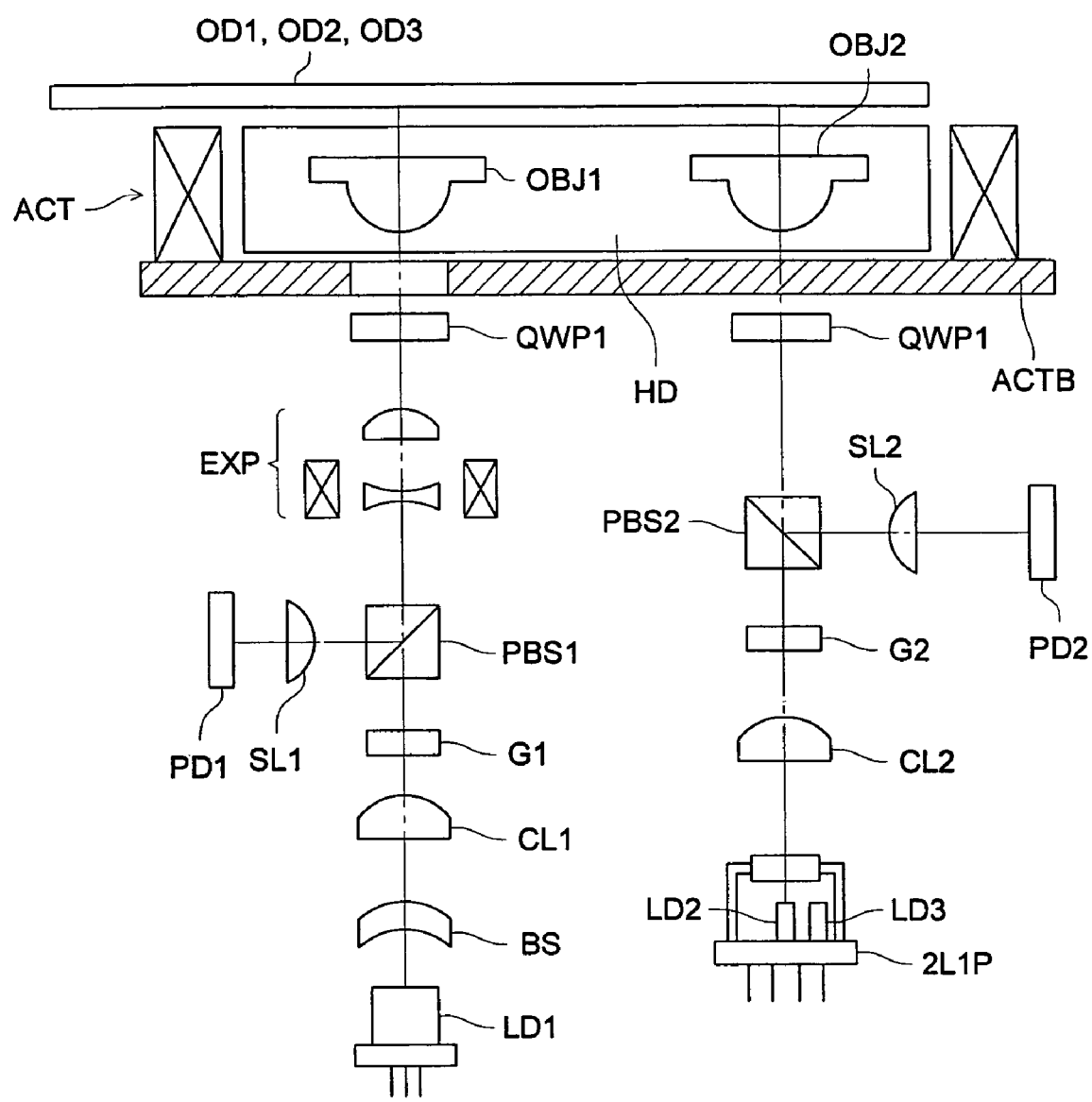
FIG. 5 illustrates a schematic sectional block diagram of optical pickup apparatus of the invention.

FIG. 5 shows a schematic cross sectional view of the third embodiment of an optical pickup apparatus capable of recording and/or reproducing information onto/from a high density DVD (the first optical disc), a conventional DVD (the second optical disc) and a CD (third optical disc). In this embodiment, first semiconductor laser LD1 and second semiconductor laser LD2 are packaged into one package, so called 2-laser-1-package 2L1P.

The supporting system of the objective lens onto the lens holder HD is the same system of the embodiment described above (refer to FIG. 3). As shown in FIG. 5, the lens holder HD is supported by actuator ACT so that the lens holder HD at least two-dimensionally moves.

When recording and/or reproducing information onto/from the first optical disc OD1, in FIG. 5, the light beams emitted from the first semiconductor laser LD1 (wavelength of $\lambda 1=380$ nm-450 nm) enter into first collimator lens CL1 after passing through beam-shaper BS, whereby the shape of the light beams is corrected. The light beams outputted from the first collimator lens pass through diffraction grating G for separating the light beams emitted from the light beam source into main beams for recording/reproducing and sub-beams for tracking error detecting signals, polarized beam splitter PBS and expander EXP.

The light beams passed through expander EXP is converged by the first objective lens OBJ1 on the information recording surface to form a light beam spot after passing through the first quarter wavelength plate QWP1 and the protective layer (thickness t1=0.1-0.7 mm) of the first optical disc OD1.

The light beams modulated by information pits formed on the information recording surface pass through the first objective lens OBJ1, the first quarter wavelength plate QWP1, the expander EXP, and are reflected by the first polarized beam splitter PBS1. Thereafter, since the light beams enter into detected surface of the first photo detector PD1 via the first sensor lens SL1. As a result, signals which were read from the first optical disc are obtained by using the output signals of the first photo detector PD1.

Focal point detection and track detection are conducted by detecting a beam spot shape change and the change of the amount of light due to the position change of the beam spot on the first photo-detector PD1. The actuator ACT is driven to move the first objective lens OBJ1 together with the lens holder HD so that the light beams from the first semiconductor laser LD1 converge onto the recording surface of the optical disc OD1.

When recording and/or reproducing information onto/from the second optical disc OD2, the light beams emitted from the second semiconductor laser LD2 (wavelength of $\lambda 2=600$ nm-700 nm) enter into second collimator lens CL2 after going out from the 2-laser-1-package 2L1P. The light beams outputted from the second collimator lens CL2 pass through the second diffraction grating G2 and further pass the second polarized beam splitter PBS2.

The light beams passed through the second beam splitter PBS2 is converged by the second objective lens OBJ2 onto the information recording surface to form a light beam spot after passing through the second quarter wavelength plate QWP2 and the protective layer (thickness of t2=0.5-0.7 mm) of the second optical disc OD2.

The light beams modulated by information pits formed on the information recording surface pass through the second objective lens OBJ2 and the second quarter wavelength plate QWP2, then reflected by the second polarized beam splitter PBS2. Thereafter, since the light beams enter into detected surface of the second photo detector PD2 via the second sensor lens SL2. As a result, signal which was read from the second optical disc OD2 is obtained by using the output signals of the second photo detector PD2.

Focal point detection and track detection are conducted by detecting a beam spot shape change and the change of the amount of light due to the position change of the beam spot on the second photo-detector PD2. The actuator ACT is driven to move the second objective lens OBJ2 together with the lens holder HD so that the light beams from the second semiconductor laser LD2 converge onto the recording surface of the second optical disc OD2.

When information is recorded and/or reproduced onto/from the third optical disc OD3, the light beams emitted from the third laser LD3 (wavelength of $\lambda 3=700$ nm-800 nm) enter into the second collimator lens CL2 after being outputted from the 2-laser-1-package 2L1P. The light beams outputted from the second collimator lens CL2 pass through the second diffraction grating G2 and the second polarized beam splitter PBS2.

The light beams passed through the second beam splitter PBS2 is converged onto the information recording surface to form a light beam spot by the third objective lens OBJ3 after passing through the second quarter wavelength plate QWP2 and the protective layer (thickness of t3=1.1-1.3 mm) of the third optical disc OD3.

The light beams modulated by information pits formed on the information recording surface pass through the second objective lens OBJ2 again and the second quarter wavelength plate QWP2, then reflected by the second polarized beam splitter PBS2. Thereafter, the light beams enter into detected surface of the second photo detector PD2 via the second sensor lens SL2. As a result, the signal which was read from the third optical disc OD3 is obtained by using the output signal of the second photo detector PD2.

Focal point detection and track detection are conducted by detecting a beam spot shape change and the change of the amount of light due to the position change of the beam spot on the second photo-detector PD2. The actuator ACT is driven to move the second objective lens OBJ2 together with the lens holder HD so that the light beams from the second semiconductor laser LD2 converge onto the recording surface of the second optical disc OD2.

In this embodiment, since 2-laser-1-package, which includes the second laser LD2 and the third laser LD3 is used, these light sources cannot be independently adjusted. Consequently, when assembling the optical pickup apparatus, the adjustments described in (1)-(3) and (5)-(7) may be conducted. In the case of 2-laser-1-package, which includes two semiconductor lasers, the distance between two light sources is, in general, approximately 100 μm. If the distance is not more than approximately 150 μm, since the angle formed between two incident light beams entering into the second objective lens OBJ2 falls within 1°, it becomes possible to obtain a good image forming spot for both light beams by applying the second objective lens designed based on the image height priority design method for the light beams having a largely inclined angle. Particularly, when the objective lens is designed based on the image height design method, it is preferable that the adjustments described in (1) and (5) are performed so that the light beams having a shorter wavelength (the light beams emitted from the second semiconductor) closes to the optical axis.

The coma aberration of the light beams spot formed by the light beams emitted from each semiconductor can be suppressed based on the adjustment described above. However, in this embodiment, driving a relative tilt angle changing device in response to the signal from an photo-detector corrects the coma aberration caused by warp of a disc and the coma aberration caused by residual error. Further, it is possible to reduce the load of the relative tilt angle changing device in an actual operation of the optical pickup by adjusting the coma aberration when assembling the optical pickup apparatus. As a result, the reduction of cost of the tilt angle changing mechanism, the miniaturization and the energy saving can be attained.

Further, according to the embodiment of the present invention, since an objective lens dedicated to the first semiconductor laser and an objective lens being used by the second semiconductor laser and the third semiconductor laser are provided, optical design margin for the image formation performance associated with each optical disc corresponding to each wavelength is generated. Particularly, according this embodiment, the thickness of the lens and working distance can be designed small. As a result, it becomes effective when designing a thin optical pickup apparatus. Further, since the aberration margin of the objective lens becomes large, the aberration of other optical elements in the optical pickup can be eased. It becomes possible to design optical elements suitable for mass production without requiring sever mechanical accuracies on structural parts of the optical pickup apparatus and lower the cost.

Figure 6:
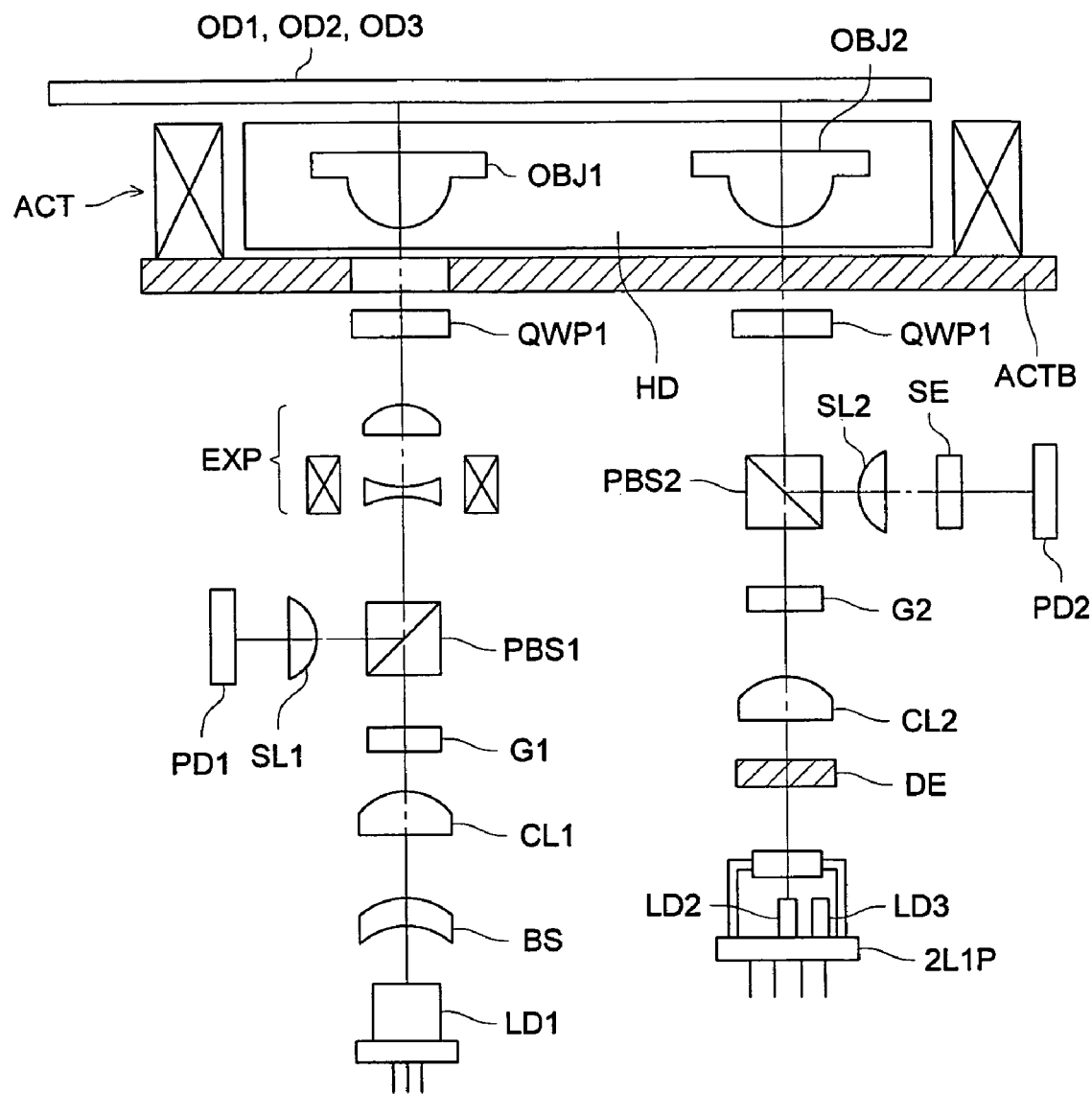
FIG. 6 illustrates a schematic sectional block diagram of optical pickup apparatus of the invention.

FIG. 6 shows a schematic cross sectional view of the fourth embodiment of an optical pickup apparatus capable of recording and/or reproducing information onto/from a high density DVD (the first optical disc), a conventional DVD (the second optical disc) and a CD (third optical disc). In this embodiment, the second semiconductor laser LD2 and the third semiconductor laser LD3 are packaged into one package, so called 2-laser-1-package 2L1P.

The supporting system of the objective lens onto the lens holder HD is the same system of the embodiment described above (refer to FIG. 3). As shown in FIG. 6, the lens holder HD is supported by actuator ACT so that the lens holder HD at least two-dimensionally moves.

When recording and/or reproducing information onto/from the first optical disc OD1, in FIG. 6, the light beams emitted from the first semiconductor laser LD1 (wavelength of λ1=380 nm-450 nm) enter into first collimator lens CL1 after passing through beam-shaper BS, whereby the shape of the light beams is corrected. The light beams outputted from the first collimator lens CL1 pass through the first diffraction grating G1 for separating the light beams emitted from the light beam source into main beams for recording/reproducing and sub-beams for tracking error detecting signals, the first polarized beam splitter PBS1 and expander EXP.

The light beams passed through expander EXP is converged by the first objective lens OBJ1 on the information recording surface to form a light beam spot after passing through the first quarter wavelength plate QWP1 and the protective layer (thickness t1=0.1-0.7 mm) of the first optical disc OD1.

The light beams modulated by information pits formed on the information recording surface pass through the first objective lens OBJ1, the first quarter wavelength plate QWP1, the expander EXP, and are reflected by the first polarized beam splitter PBS1. Thereafter, since the light beams enter into detected surface of the first photo detector PD1 via the first sensor lens SL1. As a result, signals which were read from the first optical disc OD1 are obtained by using the output signals of the first photo detector PD1.

Focal point detection and track detection are conducted by detecting a beam spot shape change and the change of the amount of light due to the position change of the beam spot on the photo-detector PD. The actuator ACT is driven to move the first objective lens OBJ1 together with the lens holder HD so that the light beams from the first semiconductor laser LD1 converge onto the recording surface of the optical disc OD1.

When recording and/or reproducing information onto/from the second optical disc OD2, the light beams emitted from the second semiconductor laser LD2 (wavelength of λ2=600 nm-700 nm) pass through diffraction element DE enter into second collimator lens CL2 after going out from the 2-laser-1-package 2L1P. The light beams outputted from the second collimator lens CL2 pass through the second diffraction grating G2 and further pass through the second polarized beam splitter PBS2.

The light beams passed through the second beam splitter PBS2 is converged by the second objective lens OBJ2 onto the information recording surface to form a light beam spot after passing through the second quarter wavelength plate QWP2 and the protective layer (thickness t2=0.5-0.7 mm) of the second optical disc OD2.

The light beams modulated by information pits formed on the information recording surface pass through the second objective lens OBJ2 and the second quarter wavelength plate QWP2, then reflected by the second polarized beam splitter PBS2. Thereafter, since the light beams enter into detected surface of the second photo detector PD2 via the second sensor lens SL2. As a result, signal which was read from the second optical disc OD2 is obtained by using the output signal of the second photo detector PD2.

Focal point detection and track detection are conducted by detecting a beam spot shape change and the change of the amount of light due to the position change of the beam spot on the second photo-detector PD2. The actuator ACT is driven to move the second objective lens OBJ2 together with the lens holder HD so that the light beams from the second semiconductor laser LD2 converge onto the recording surface of the second optical disc OD2.

When information is recorded and/or reproduced onto/from the third optical disc OD3, the light beams emitted from the third laser LD3 (wavelength of λ3=700 nm-800 nm) enter into the second collimator lens CL2 after being outputted from the 2-laser-1-package 2L1P and passing through the diffraction element DE. The light beams outputted from the second collimator lens CL2 pass through the second diffraction grating G2 and the second polarized beam splitter PBS2.

The light beams passed through the second beam splitter PBS2 is converged onto the information recording surface to form a light beam spot by the second objective lens OBJ2 after passing through the second quarter wavelength plate QWP2 and the protective layer (thickness of t3=1.1-1.3 mm) of the third optical disc OD3.

The light beams modulated by the information pits formed on the information recording surface pass through the second objective lens OBJ2 again and the second quarter wavelength plate QWP2, then reflected by the second polarized beam splitter PBS2. Thereafter, the light beams enter into detected surface of the second photo detector PD2 via the second sensor lens SL2. As a result, the signal which was read from the third optical disc OD3 is obtained by using the output signal of the second photo detector PD2.

Focal point detection and track detection are conducted by detecting a beam spot shape change and the change of the amount of light due to the position change of the beam spot on the second photo-detector PD2. The actuator ACT is driven to move the second objective lens OBJ2 together with the lens holder HD so that the light beams from the second semiconductor laser LD2 converge onto the recording surface of the second optical disc OD2.

In this embodiment, since 2-laser-1-package, which includes the second laser LD2 and the third laser LD3 is used, these light sources cannot be independently adjusted. However, when the light beams outputted from the 2-laser-1-package 2L1P enter into the diffraction element DE, the coma aberration of the light beams can be corrected. The correct amount changes in response to the rotation amount of diffraction element. Consequently, when assembling the optical pickup apparatus, and conducting the adjustments described in (2), (4), (6) and (8), the shift adjustment process may be conducted by appropriately rotating the diffraction element DE instead of conducting a shift adjustment by shifting the third semiconductor laser LD3 in the direction orthogonal to the optical axis. Optical axis correcting element SE moves to correct its position so that the difference between the positions of light beam spots formed on the receiving surface of the second photo-detector is corrected.

Further, in this embodiment, since the second semiconductor laser DL2 and the third semiconductor laser LD3 are packaged into one package, when the distance between two light beam sources is large, for example, not less than 100 μm, the inclined angle of the optical axis of the optical path corresponding to the image height priority design method may become large. When the both light beams of both wavelengths are respectively divided into three beams to be used for detecting tracking error to be detected by the photo-detector PD2, the tilt angle priority design method is also taken account at a certain degree and at that time the sine condition of the image height priority design method has to be mitigated at a certain degree. Consequently, when the inclined angle of the optical axis corresponding to the wavelength in the object lens designed based on the image height priority design method is large, the coma aberration occurs. In order to correct the coma aberration, it is necessary to repeat the adjustment of (3)-(7), which is one of the cost factors. Since the optical axis of a pair of sub-beams becomes unbalance with the optical axis of the objective lens, the quality of both sub-beam spot may become different. Then since, by applying the diffraction element DE, it becomes possible to correct the light beams as if the light beam sources of the second semiconductor laser LD2 and the third semiconductor laser apparently close each other, the problems described above can be solved.

The coma aberration of the light beams spot formed by the light beams emitted from each semiconductor can be suppressed based on the adjustment described above. However, in this embodiment, driving a relative tilt angle changing device in response to the signal from an photo-detector corrects the coma aberration caused by warp of a disc and the coma aberration caused by residual error. Further, it is possible to reduce the load of the relative tilt angle changing device in an actual operation of the optical pickup by adjusting the coma aberration when assembling the optical pickup apparatus. As a result, the reduction of cost of the tilt angle changing mechanism, the miniaturization and the energy saving can be attained.

Further, according to the embodiment of the present invention, since an objective lens dedicated to the first semiconductor laser and an objective lens being used by the second semiconductor laser and the third semiconductor laser are provided, optical design margin for the image formation performance associated wit each optical disc corresponding to each wavelength is generated. Particularly, according this embodiment, the thickness of the lens and working distance can be designed small. As a result, it becomes effective when designing a thin optical pickup apparatus. Further, since the aberration margin of the objective lens becomes large, the aberration of other optical elements in the optical pickup can be eased. It becomes possible to design optical elements suitable for mass production without requiring sever mechanical accuracies on structural parts of the optical pickup apparatus and lower the cost.

Figure 7:
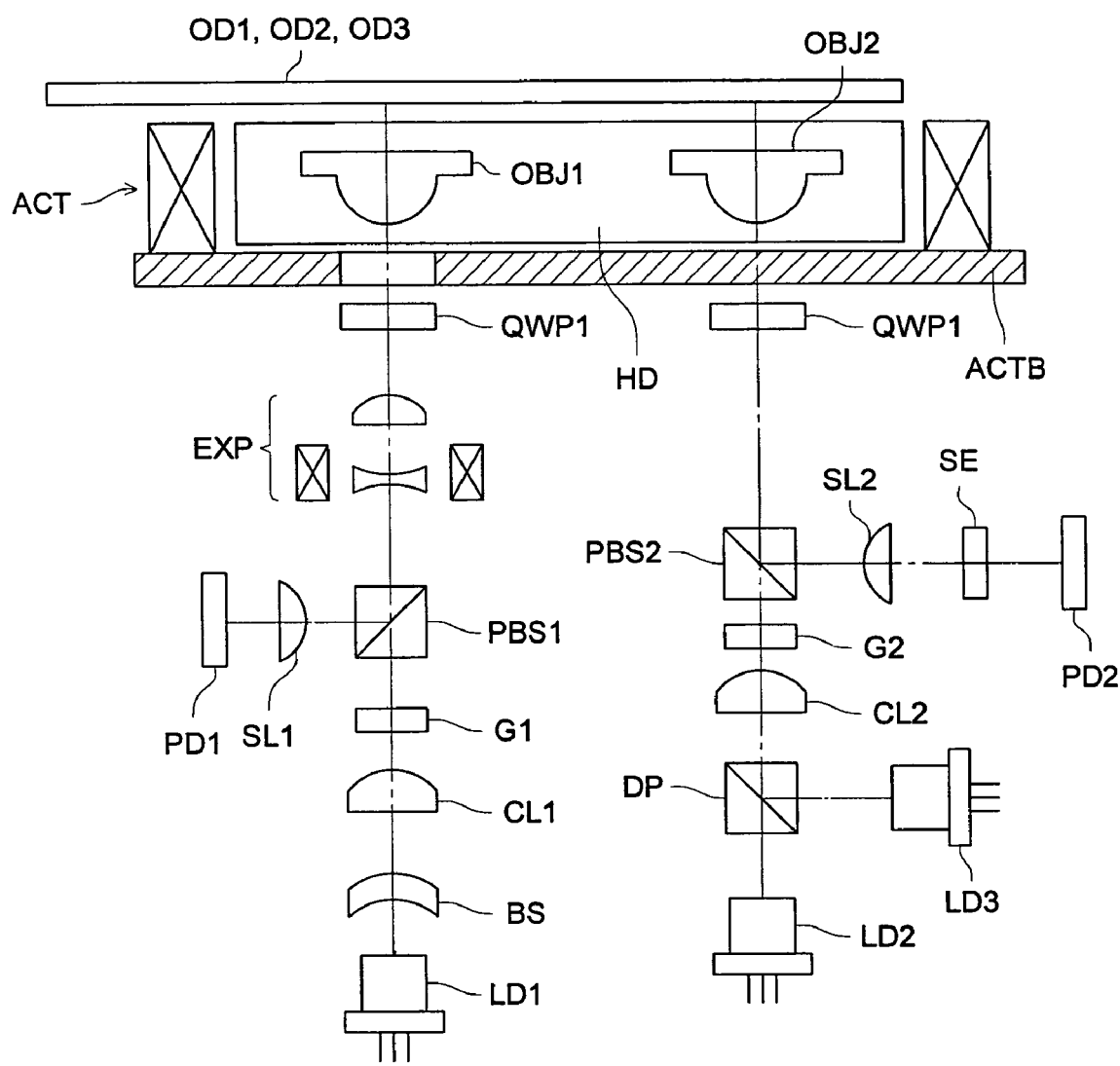
FIG. 7 illustrates a schematic sectional block diagram of optical pickup apparatus of the invention.

FIG. 7 shows a schematic cross sectional view of the fifth embodiment of an optical pickup apparatus capable of recording and/or reproducing information onto/from a high density DVD (the first optical disc), a conventional DVD (the second optical disc) and a CD (third optical disc).

The supporting system of the objective lens onto the lens holder HD is the same system of the embodiment described above (refer to FIG. 3). As shown in FIG. 7, the lens holder HD is supported by the actuator ACT so that the lens holder HD at least two-dimensionally moves.

When recording and/or reproducing information onto/from the first optical disc OD1, in FIG. 7, the light beams emitted from the first semiconductor laser LD1 (wavelength of $\lambda 1$=380 nm-450 nm) enter into first collimator lens CL1 after passing through beam-shaper BS, whereby the shape of the light beams is corrected. The light beams outputted from the first collimator lens CL1 pass through the first diffraction grating G1 for separating the light beams emitted from the light beam source into main beams for recording/reproducing and sub-beams for tracking error detecting signals, the first polarized beam splitter PBS1 and expander EXP.

The light beams passed through expander EXP is converged by the first objective lens OBJ1 on the information recording surface to form a light beam spot after passing through the first quarter wavelength plate QWP1 and the protective layer (thickness t1=0.1-0.7 mm) of the first optical disc OD1.

The light beams modulated by information pits formed on the information recording surface pass through the first objective lens OBJ1, the first quarter wavelength plate QWP1, the expander EXP, and are reflected by the first polarized beam splitter PBS1. Thereafter, since the light beams enter into detected surface of the first photo detector PD1 via the first sensor lens SL1. As a result, signal which was read from the first optical disc OD1 is obtained by using the output signal of the first photo detector PD1.

Focal point detection and track detection are conducted by detecting a beam spot shape change and the change of the amount of light due to the position change of the beam spot on the first photo-detector PD1. The actuator ACT is driven to move the first objective lens OBJ1 together with the lens holder HD so that the light beams from the first semiconductor laser LD1 converge onto the recording surface of the optical disc OD1.

When recording and/or reproducing information onto/from the second optical disc OD2, the light beams emitted from the second semiconductor laser LD2 (wavelength of λ2=600 nm-700 nm) pass through dichroic prism DP and enter into second collimator lens CL2. The light beams outputted from the second collimator lens CL2 pass through the second diffraction grating G2 and further pass through the second polarized beam splitter PBS2.

The light beams passed through the second beam splitter PBS2 is converged by the second objective lens OBJ2 onto the information recording surface to form a light beam spot after passing through the second quarter wavelength plate QWP2 and the protective layer (thickness of t2=0.5-0.7 mm) of the second optical disc OD2.

The light beams modulated by information pits formed on the information recording surface pass through the second objective lens OBJ2 and the second quarter wavelength plate QWP2, then reflected by the second polarized beam splitter PBS2. Thereafter, since the light beams enter into detected surface of the second photo detector PD2 via the second sensor lens SL2. As a result, signal which was read from the second optical disc OD2 is obtained by using the output signal of the second photo detector PD2. The optical axis correction element SE functions to converge the light beams emitted from any light source onto the optimum position of the second photo-detector PD2 by correcting the optical axis deviation caused by when applying a shifting process to at least one of the second semiconductor laser LD2 and the third semiconductor laser LD3.

Focal point detection and track detection are conducted by detecting a beam spot shape change and the change of the amount of light due to the position change of the beam spot on the second photo-detector PD2. The actuator ACT is driven to move the second objective lens OBJ2 together with the lens holder HD so that the light beams from the second semiconductor laser LD2 converge onto the recording surface of the second optical disc OD2.

When information is recorded and/or reproduced onto/from the third optical disc OD3, the light beams emitted from the third laser LD3 (wavelength λ3=700 nm-800 nm) enter into the second collimator lens CL2 after being passing through the diffraction element DE. The light beams outputted from the second collimator lens CL2 pass through the second diffraction grating G2 and the second polarized beam splitter PBS2.

The light beams passed through the second beam splitter PBS2 is converged onto the information recording surface to form a light beam spot by the second objective lens OBJ2 after passing through the second quarter wavelength plate QWP2 and the protective layer (thickness of t3=1.1-1.3 mm) of the third optical disc OD3.

The light beams modulated by the information pits formed on the information recording surface pass through the second objective lens OBJ2 again and the second quarter wavelength plate QWP2, then reflected by the second polarized beam splitter PBS2. Thereafter, the light beams enter into detected surface of the second photo detector PD2 via the optical axis correction element SE. As a result, the signal which was read from the third optical disc OD3 is obtained by using the output signal of the second photo detector PD2.

Focal point detection and track detection are conducted by detecting a beam spot shape change and the change of the amount of light due to the position change of the beam spot on the second photo-detector PD2. The actuator ACT is driven to move the second objective lens OBJ2 together with the lens holder HD so that the light beams from the second semiconductor laser LD2 converge onto the recording surface of the second optical disc OD2.

When assembling the optical pickup apparatus of the embodiment of the present invention, the adjustments described in (1)-(8) may be applied.

The coma aberration of the light beams spot formed by the light beams emitted from each semiconductor can be suppressed based on the adjustment described above. However, in this embodiment, driving a relative tilt angle changing device in response to the signal from an photo-detector corrects the coma aberration caused by warp of a disc and the coma aberration caused by residual error. Further, it is possible to reduce the load of the relative tilt angle changing device in an actual operation of the optical pickup by adjusting the coma aberration when assembling the optical pickup apparatus. As a result, the reduction of cost of the tilt angle changing mechanism, the miniaturization and the energy saving can be attained.

Further, according to the embodiment of the present invention, since an objective lens dedicated to the first semiconductor laser and an objective lens being used by the second semiconductor laser and the third semiconductor laser are provided, optical design margin for the image formation performance associated wit each optical disc corresponding to each wavelength is generated. Particularly, according this embodiment, the thickness of the lens and working distance can be designed small. As a result, it becomes effective when designing a thin optical pickup apparatus. Further, since the aberration margin of the objective lens becomes large, the aberration of other optical elements in the optical pickup can be eased. It becomes possible to design optical elements suitable for mass production without requiring sever mechanical accuracies on structural parts of the optical pickup apparatus and lower the cost.

Figure 8:
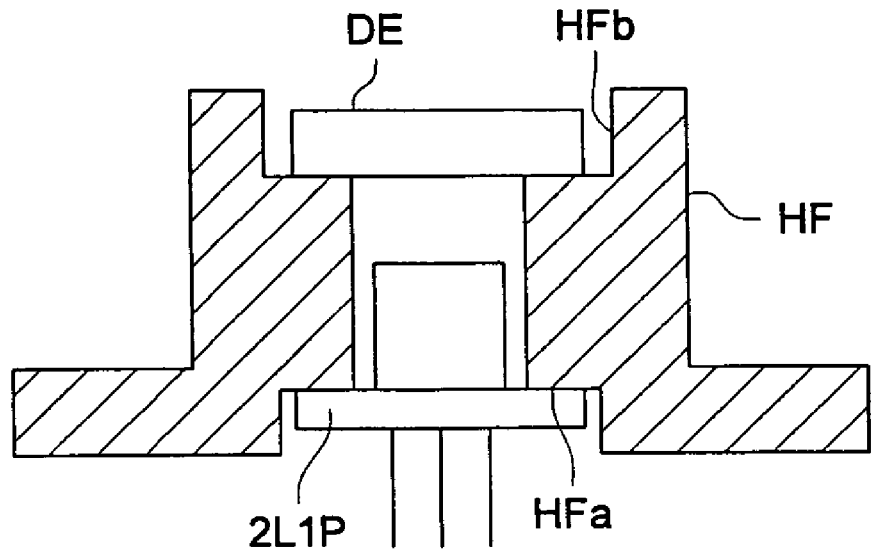
FIG. 8 illustrates two sectional views, each showing an example having a light source of 2-laser-1-package and a diffraction grating.
Figure 8:
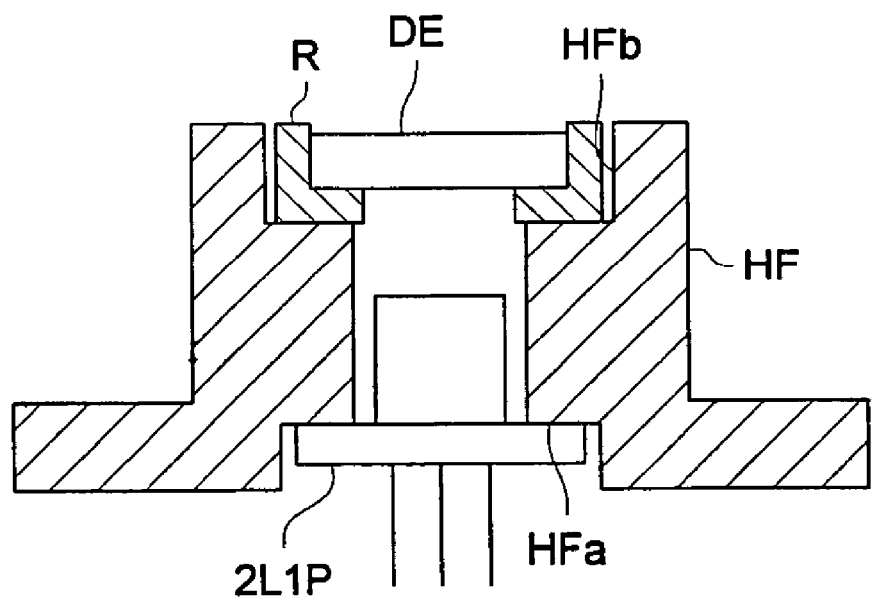

FIGS. 8(a) and 8(b) are cross sectional views showing two example of a light source having 2-laser-1-package and a diffraction element, which are applicable to the embodiment which uses the 2-laser-1-package light source and the diffraction element described above. In FIG. 8(a), the 2-laser-1-package 2L1P is attached to a counterbore HFb formed in the bottom surface of the holding frame HF being substantially cylindrical and the diffraction element DE is attached on the counterbore HFb formed on the top surface. It is preferable that the diffraction element DE is adhered after being appropriately rotated on the counterbore HFb when assembling.

In FIG. 8(b), the 2-laser-1-package 2L1P is attached to a counterbore HFb formed in the bottom surface of the holding frame HF being substantially cylindrical and the diffraction element DE is provided on the counterbore HFb formed on the top surface via a ring-shaped support R. It is preferable that the diffraction element DE is adhered after being appropriately rotated on the counterbore HFb when assembling.

Figure 9:
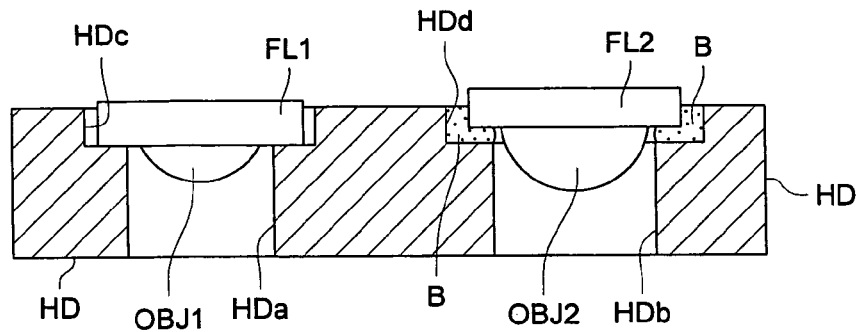
FIG. 9 illustrates a sectional view of the deviation of a lens holder, which is the same figure as FIG. 3.

FIG. 9 is a cross sectional view of the deviation of the lens holder shown in FIG. 3 showing a deviation of the lens holder. Comparing with the embodiment shown in FIG. 3, following points are different. In this deviation, the internal surface of the counterbore HDd provided on the upper surface of the opening HDb and the flange FL2 of the objective lens OBJ2 are not in touch with each other, and the counterbore HDd provided on the upper surface of the opening HDb and the flange FL2 of the objective lens OBJ2 are adhered after the tilt angle against the lens holder HD of the objective lens OBJ2 is adjusted. More concretely, the tilt angle of the objective lens OBJ2 is adjusted while the objective lens OBJ2 is held by a tool (not shown) in a non-contact state against the lens holder HD. After adjusted, a bonding agent B is filled between the flange FL2 of objective lens OBJ2 and the counterbore HDd of lens holder HD. Since other things are common with the one shown in FIG. 3, the description will be omitted here.

Figure 10:
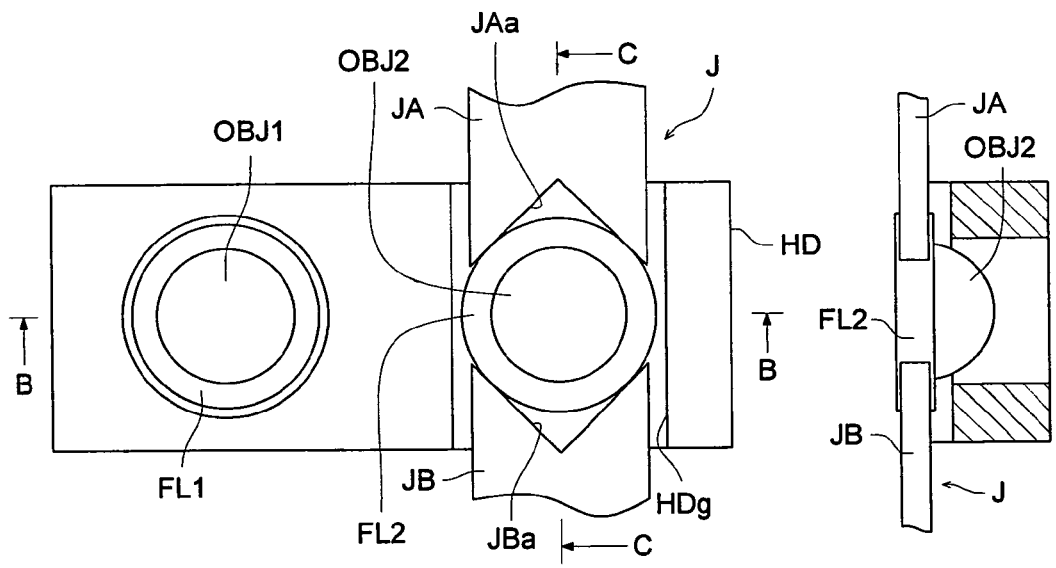
FIG. 10 illustrates a tool, which is holding the objective lens, and the other example of the lens holder.
Figure 10:
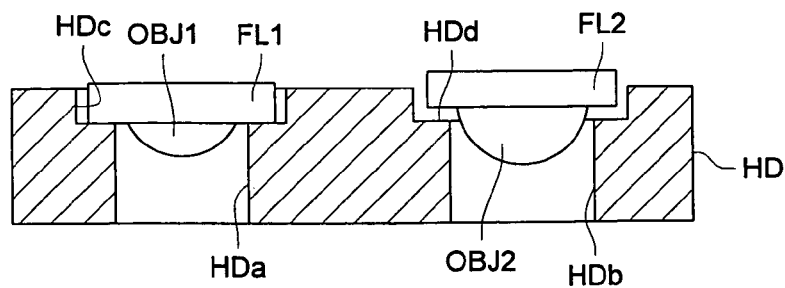
Figure 11:
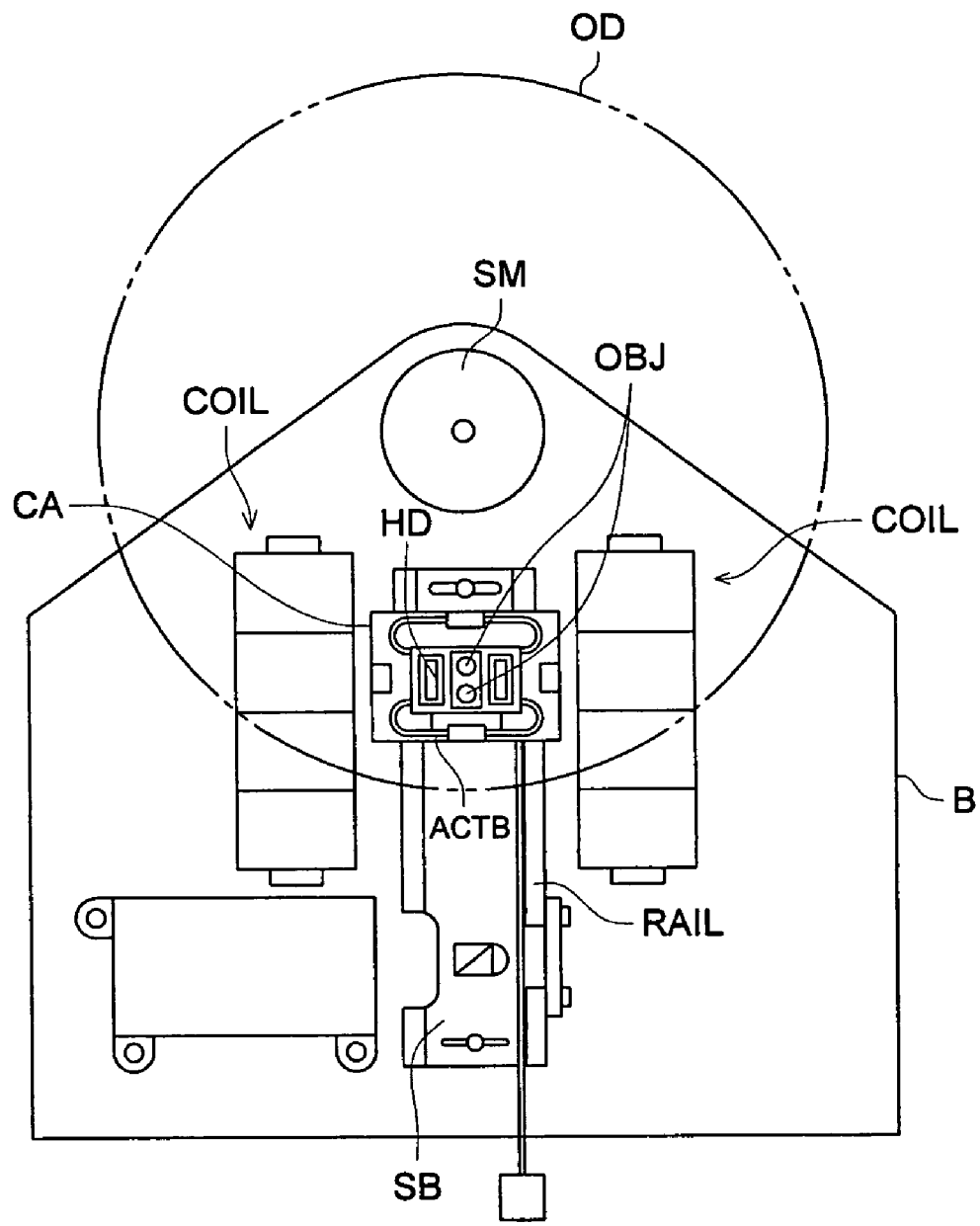
FIG. 11 illustrates a top view of an optical pickup apparatus.

FIG. 10 shows a tool for holding the objective lens and the other deviation of the lens holder. FIG. 10(*a*) is a top view and FIG. 10(*b*) is a cross-sectional view viewed from the direction shown by an arrow, where the configuration shown in FIG. 10(*a*) is cut along the line of B-B. FIG. 10(*c*) is a cross-sectional view of lens holder shown in FIG. 10(*a*) which is cut along the line C-C.

In this deviation, a groove HDg (a concave section) is formed on the upper surface of the lens holder HD, the groove HDg being across the longitudinal direction. The tool J for holding the objective lens OBJ2 includes tapered supports JAa and Jab, which are formed so that the width becomes narrower as it goes from the front edge toward the rear. Other than this, since the same structure is used, the description will be omitted.

When adjusting the tilt angle, the tool J for holding the flange FL of the objective lens OBJ2 held by the taped support JAa and JAb approaches from over the lens holder HD (above the FIG. 10 (*b*)) to the opening HDb. At this moment of time, since the groove HDg is arranged, the interference between tool J and lens holder HD can be avoided.

Adjust the tilt angle of the objective lens OBJ2, after lowering the tool J to the position shown in FIG. 10(*c*), and fill the adhesive (not shown) between the flange FL2 of the objective lens OBJ2 and the counterbore HDd of lens holder HD, after conducting the adjustment. After solidifying the adhesive, the holding the objective lens OBJ2 completes after moving arms JA and JB in the direction where the arms remove each other.

As described above, according to the assembly method for the optical pickup apparatus of the embodiment of the invention, since the coma aberration of each light beams emitted from the first to the third semiconductor lasers are optimized, it becomes possible to suppress the coma aberration by operating the tilt angle changing mechanism, even though the deviation of the tilt angle of the disc to be in use in the operational condition occurs after the coma aberration adjustment. Further, since the tilt angle changing mechanism can reduce the load of a coma suppress-function by optimizing the coma adjustment when conducting the coma adjustment, it becomes easy to make the tilt angle changing mechanism. Accordingly, cost saving and its driving circuit and cost saving and the downsizing of the apparatus can be attained.

The embodiments of the present invention have been described above. The present invention is not limited to the embodiments described above. It is to be understood that changes and variations may be made without departing from the spirit or scope of the appended claims.

What is claimed is:

1. A method for assembling an optical pickup apparatus including, a first light source for emitting first light beams having a wavelength of $\lambda 1$, where 380 nm$\leq \lambda 1 \leq$450 nm, a second light source for emitting second light beams having a wavelength of $\lambda 2$, where 600 nm$\leq \lambda 2 \leq$700 nm, a third light source for emitting third light beams having a wavelength of $\lambda 3$, where 750 nm$\leq \lambda 3 \leq$850 nm, a first objective lens, a second objective lens, a lens holder for holding the first objective lens and the second objective lens, an actuator for supporting the lens holder and driving the lens holder, and an actuator base for supporting the actuator, wherein:

the first light beams from the first light source are applied to record and/or reproduce information onto/from a first optical information recording medium by converging the first light beams onto an information recording surface of the first optical information recording medium through a protective layer having thickness of t1 of the first optical information recording medium via the first objective lens;

the second light beams from the second light source are applied to record and/or reproduce information onto/from a second optical information recording medium by converging the second light beams onto an information recording surface of the second optical information recording medium through a protective layer having thickness of t2 of the second optical information recording medium via the second objective lens, where t1$\leq$t2;

the third light beams from the third light source are applied to record and/or reproduce information onto/from a third optical information recording medium by converging the third light beams onto an information recording surface of the third optical information recording medium through a protective layer having thickness of t3 of the third optical information recording medium via the second objective lens, where t2$\leq$t3;

the optical pickup apparatus is used in an optical information recording-reproducing apparatus having a relative tilt angle changing device for changing a relative tilt angle formed between the optical information recording medium and one of the first and second objective lenses of the optical pickup apparatus;

the relative tilt angle changing device is arranged to be able to control a coma aberration associated with light beams converged onto the recording surface of the optical information recording medium by changing the relative tilt angle formed between the optical information recording medium and one of the first and second objective lenses;

the first objective lens is designed based on an image height priority design method against the first light beams, the image height design method being a design method for correcting a spherical aberration and a sine condition; and the second objective lens is designed based on the image height priority design method against the second light beams, and a tilt angle priority design method against the third light beams, the tilt angle priority design method being a design method for correcting the spherical aberration while not correcting the sine condition, the method for assembling the optical pickup apparatus comprising the steps of:

adjusting a first tilt angle of the actuator base so that a coma aberration of a spot formed by the first light beams decreases when the first light beams are converged onto the first recording medium via the first objective lens, adjusting a second tilt angle formed between the second objective lens and the lens holder which is supported by the actuator base through the actuator so that a coma aberration of a beam spot formed by the second light beams decreases when the second light beams are converged onto the second recording medium via the second objective lens; and conducting a shift adjustment process for the third light source so that a coma aberration of a beam spot formed by the third light beams decreases when the third light beams are converged onto the third recording medium via the second objective lens.

2. The method for assembling the optical pickup apparatus of claim 1, wherein the shift adjustment process is conducted by moving a light source to be adjusted in a direction being perpendicular to a reference optical pickup axis.

3. The method for assembling the optical pickup apparatus of claim 1, wherein the first light source and the second light source are included in the same package.

4. The method for assembling the optical pickup apparatus of claim 1, wherein the second light source and the third light source are included in the same package.

5. The method for assembling the optical pickup apparatus of claim 1, wherein the second light source and the third light source are included in the same package having an optical axis correcting element for changing an emitting direction of the light beams from one of the first light beams or the second light beams, the optical axis correcting element being adjustably attached on the package, and the shift adjustment process is conducted by moving the optical axis correcting element in an optical axis direction or in a direction being perpendicular to the optical axis.

6. The method for assembling the optical pickup apparatus of claim 1, the optical pickup apparatus further comprising:
   a photo-detector for detecting light beams reflected from at least two optical information recording media from the first, second, and third optical information recording media;
   a separating device for guiding the light beams reflected from at least two optical information recording media from the first, second, and third optical information recording media to the photo-detector; and
   an optical axis adjusting element arranged between the separating device and the photo-detector.

7. The method for assembling the optical pickup apparatus of claim 1, the optical pickup apparatus further comprising:
   a diffraction grating for separating light beams emitted from one of the first to third light sources into main beams for recording and/or reproducing information and sub-beams used for tracking error signals;
   wherein the sub-beams are converged into beam spots having aberrations of no more than 0.07 $\lambda$rms on an image recording surface of one of the first to third optical information recording media, where $\lambda$ represents a wavelength of the light beams of the light source.

8. The method for assembling the optical pickup apparatus of claim 1, wherein the lens holder having a supporting section including a part of a spherical surface centering on a principal point of the first objective lens or the second optical lens.

9. The method for assembling the optical pickup apparatus of claim 1, wherein a tilt angle of one of the first and second objective lenses against the lens holder is adjusted while the one of the first and second objective lenses is held by a tool in a non-contact state against the lens holder, thereafter an adhesive is filled in a space formed between the lens holder and the one of the first and second objective lenses whose tilt angle has been adjusted to fix the one of the first and second objective lenses and the lens holder.

10. The method for assembling the optical pickup apparatus claim 1, wherein the lens holder has a concave section to avoid interference with an arm for supporting the objective lens to be adjusted when a tilt angle of the first objective lens or the second objective lens is adjusted.

11. The method for assembling the optical pickup apparatus of claim 1, wherein the relative tilt angle changing device is used to incline the lens holder.

12. The method for assembling the optical pickup apparatus of claim 1, wherein the relative tilt angle changing device is used to incline an overall optical system including the objective lens and the light source.

13. The method for assembling the optical pickup apparatus of claim 1, wherein the optical image information recording-reproducing apparatus includes a spindle motor for rotating the optical information recording medium and the relative tilt angle changing device inclines the spindle motor.

14. The optical pickup apparatus assembled by the method of claim 1.

* * * * *